United States Patent [19]

Irvin

[11] Patent Number: 5,742,500
[45] Date of Patent: Apr. 21, 1998

[54] PUMP STATION CONTROL SYSTEM AND METHOD

[76] Inventor: William A. Irvin, 245 Cokesbury Ct., Green Cove Springs, Fla. 32043

[21] Appl. No.: 518,190

[22] Filed: Aug. 23, 1995

[51] Int. Cl.$^6$ .................................................. G06F 19/00
[52] U.S. Cl. .................... 364/138; 364/156; 364/510; 417/2
[58] Field of Search .................... 364/146, 188, 364/189, 132, 138, 156, 492, 494, 509, 510, 505, 550, 551.01; 417/2, 18–20, 300

[56] References Cited

U.S. PATENT DOCUMENTS

| | | | |
|---|---|---|---|
| 3,610,779 | 10/1971 | Hubby | 417/5 |
| 3,705,532 | 12/1972 | Hubby | 73/155 |
| 3,744,932 | 7/1973 | Prevett | 417/8 |
| 4,108,574 | 8/1978 | Bartley et al. | 417/19 |
| 4,120,033 | 10/1978 | Corso et al. | 364/510 |
| 4,178,132 | 12/1979 | Shiraishi et al. | 417/5 |
| 4,258,421 | 3/1981 | Juhasz et al. | 364/442 |
| 4,330,237 | 5/1982 | Battah | 417/2 |
| 4,334,425 | 6/1982 | Crane | 73/112 |
| 4,370,098 | 1/1983 | McClain et al. | 417/18 |
| 4,437,811 | 3/1984 | Iwata et al. | 417/8 |
| 4,444,545 | 4/1984 | Sanders et al. | 417/8 |
| 4,459,671 | 7/1984 | Teass et al. | 364/442 |
| 4,475,380 | 10/1984 | Colovas et al. | 73/114 |
| 4,486,148 | 12/1984 | Battah | 417/2 |
| 4,584,654 | 4/1986 | Crane | 364/550 |
| 4,642,992 | 2/1987 | Julovich | 60/661 |
| 4,803,039 | 2/1989 | Impink, Jr. et al. | 364/188 X |
| 4,805,118 | 2/1989 | Rishel | 364/510 |
| 4,835,687 | 5/1989 | Martin | 364/550 |
| 4,843,575 | 6/1989 | Crane | 364/550 |
| 4,916,628 | 4/1990 | Kugler | 364/492 |
| 4,945,491 | 7/1990 | Rishel | 364/510 |
| 4,999,117 | 3/1991 | Palmu et al. | 364/510 X |
| 5,092,739 | 3/1992 | Gill | 417/45 |
| 5,121,318 | 6/1992 | Lipner et al. | 364/188 X |
| 5,240,380 | 8/1993 | Mabe | 417/43 |
| 5,386,360 | 1/1995 | Wilson et al. | 364/188 X |

OTHER PUBLICATIONS

*Water & Energy—KBEMS: A System for Monetary Savings from SCADA Information and Much More*, pp. 2–5, Drinking Water Research, vol. 5, No. 2, Mar./Apr. 1995.

Section 7001—Pump Control Systems, Proposal sent to Summit County, Ohio on Oct. 25, 1994.

Primary Examiner—Joseph Ruggiero
Attorney, Agent, or Firm—Allen, Dyer, Doppelt, Milbrath & Gilchrist, P.A.

[57] ABSTRACT

The pump station control system and method monitors and displays a time history of the operating parameters of a pump station. Sensed operating parameters are transmitted to an operator in real time and are stored at predetermined time intervals over a predetermined period of time. A real-time cost parameter of the system is calculated that provides a measure of the cost per throughput of the material being pumped. The system can be optimized for the cost parameter by controlling system variables such as pump speed in response to the level of fluid.

53 Claims, 42 Drawing Sheets

| p2stat.fil | | | 7x9 | 2K of 4K bytes (1K) | PRINT UTILITIES |
|---|---|---|---|---|---|
| | | | | HELP | ALARM & MENU | ALARM LOG |

PUMP 2 STATUS

ELECTRIC HP = 0.0 / KW = 0.0

———— 0 to 0 HP / 0 to 0 KW

PUMP SPEED = 0.0 % / RPM = 0

———— 0 to 100% / 0 to 0 RPM

OUTFLOW = 0 GPM / 0.00 MGD

———— 0 to 0 GPM

VFD AIR INTAKE TEMP. = 0 DEGREE F

———— 32 to 212 DEGREE FAHRENHEIT

PUMP OPERATION | ALARMS PRESS ONCE TO ACKNOWLEDGE TWICE TO RESET

| | PUMP OPERATION | | ALARMS | |
|---|---|---|---|---|
| | LEAD | ER | OVERLOAD TRIPPED | SR | WINDINGS OVERTEMP |
| | MANUAL | AR | POWER MONITOR TRIPPED | SR | UPPER BEARING OVERTEMP |
| | OFF | ER | REMOTE LOCKOUT | SR | LOWER BEARING OVERTEMP |
| | AUTO | ER | LOCAL LOCKOUT | AR | SEAL WATER FAIL |
| | CALLED VFD | ER | VFD 1 FAULT | SR | VFD HIGH TEMPERATURE |
| | CALLED ACL | SR | FAIL VFD LO RUN VERIFY | AR | VFD HIGH TEM/ SHUTDOWN |
| | RUN VFD | SR | FAIL VFD HI RUN VERIFY | AR | TEMP. XMITTER FAIL |
| | RUN ACL | SR | FAIL ACL RUN VERIFY | AR | MEGGER TRIP |
| ▨ | HIGH RUN VERIFIED | AR | POWER XMITTER FAIL | AR | VFD LOSS OF SURGE PROT. |
| ▨ | LOW RUN VERIFIED | AR | LOW LEVEL LOCKOUT | AR | HI VIBRATION WARNING |
| ▨ | RUN TIME = 99,999.95 | AR | MOISTURE IN MOTOR | SR | HI VIBRATION SHUTDOWN |

FIG. 6.

dly-hstr.fil — 5x7 — 22K of 4K bytes (8K) — PRINT UTILITIES

| PREVIOUS SCREEN | MAIN SCREEN | MAIN MENU | ALARM LOG |

DAILY FLOW ENERGY HISTORY

| PERIOD | MILLION GALLONS PUMPED | ENERGY COST DAILY | AVERAGE COST PER MILLION GALLONS | DAILY X 365 = YEARLY COST |
|---|---|---|---|---|
| TODAY TO NOW | 0.000 | 0.00 | | |
| SUNDAY | 0.000 | 0.00 | 0.00 | 0.00 |
| MONDAY | 0.000 | 0.00 | 0.00 | 0.00 |
| TUESDAY | 0.000 | 0.00 | 0.00 | 0.00 |
| WEDNESDAY | 0.000 | 0.00 | 0.00 | 0.00 |
| THURSDAY | 0.000 | 0.00 | 0.00 | 0.00 |
| FRIDAY | 0.000 | 0.00 | 0.00 | 0.00 |
| SATURDAY | 0.000 | 0.00 | 0.00 | 0.00 |
| TOTAL | 0.000 | 0.00 | | |
| AVERAGE | 0.000 | 0.00 | | |

DAY ENDS 12:00 MIDNIGHT

"TODAY TO NOW" DATA NOT INCLUDED IN "AVERAGE" OR "TOTAL".

| NOW | WEEKLY | MONTHLY | YEARLY |

FIG. 9(a).

WEEKLY FLOW ENERGY HISTORY

| PERIOD | MILLION GALLONS PUMPED | ENERGY COST WEEKLY | AVERAGE COST PER MILLION GALLONS | WEEKLY x 52 = YEARLY COST |
|---|---|---|---|---|
| THIS WEEK TO NOW | 8.429 | 213.68 | 25.35 | 11,111.36 |
| WEEK 1 | 16.446 | 404.40 | 24.59 | 21,028.80 |
| WEEK 2 | 16.189 | 396.79 | 24.51 | 20,633.20 |
| WEEK 3 | 15.432 | 370.06 | 23.98 | 19,243.09 |
| WEEK 4 | 14.049 | 335.77 | 23.90 | 17,430.10 |
| WEEK 5 | 18.711 | 445.88 | 23.83 | 23,185.92 |
| WEEK 6 | 18.657 | 443.10 | 23.75 | 23,041.40 |
| WEEK 7 | 19.732 | 459.12 | 23.70 | 23,874.05 |
| WEEK 8 | 14.901 | 351.96 | 23.62 | 18,302.00 |
| WEEK 9 | 12.551 | 296.33 | 23.61 | 15,409.11 |

WEEK ENDS SATURDAY 12:00 MIDNIGHT

WEEK 1 = LAST WEEK

FIG. 9(b).

| mth-hstr.fil | | 5x7 | 23K of 4K bytes (16K) | PRINT UTILITIES |
|---|---|---|---|---|
| | | | PREVIOUS SCREEN | MAIN SCREEN | MAIN MENU | ALARM LOG |

MONTHLY FLOW ENERGY HISTORY

| PERIOD | MILLION GALLONS PUMPED | ENERGY COST MONTHLY | AVERAGE COST PER MILLION GALLONS | MONTHLY X 12 = YEARLY COST |
|---|---|---|---|---|
| MONTH TO NOW | 75.234 | 1,846.99 | 24.55 | 22,163.94 |
| JANUARY | 143.256 | 3,326.40 | 23.22 | 39,916.85 |
| FEBRUARY | 146.712 | 3,463.87 | 23.61 | 41,566.44 |
| MARCH | 147.011 | 3,235.71 | 22.01 | 38,828.55 |
| APRIL | 149.661 | 2,963.29 | 19.80 | 35,559.45 |
| MAY | 150.132 | 2,851.01 | 18.99 | 34,212.08 |
| JUNE | 152.051 | 2,785.57 | 18.32 | 33,426.89 |
| JULY | 145.556 | 2,510.84 | 17.50 | 30,130.09 |
| AUGUST | 143.579 | 2,410.69 | 16.79 | 28,928.29 |
| SEPTEMBER | 140.720 | 2,143.17 | 15.23 | 25,717.99 |
| OCTOBER | 139.009 | 2,107.37 | 15.16 | 25,288.52 |
| NOVEMBER | 144.541 | 2,197.02 | 15.20 | 26,364.28 |
| DECEMBER | 144.066 | 2,188.36 | 15.19 | 26,260.35 |
| TOTAL | 1,746.294 | 32,183.88 | | |

"MONTH TO NOW" NOT INCLUDED IN TOTAL.

| NOW | DAILY | WEEKLY | YEARLY |
|---|---|---|---|

FIG. 9(c).

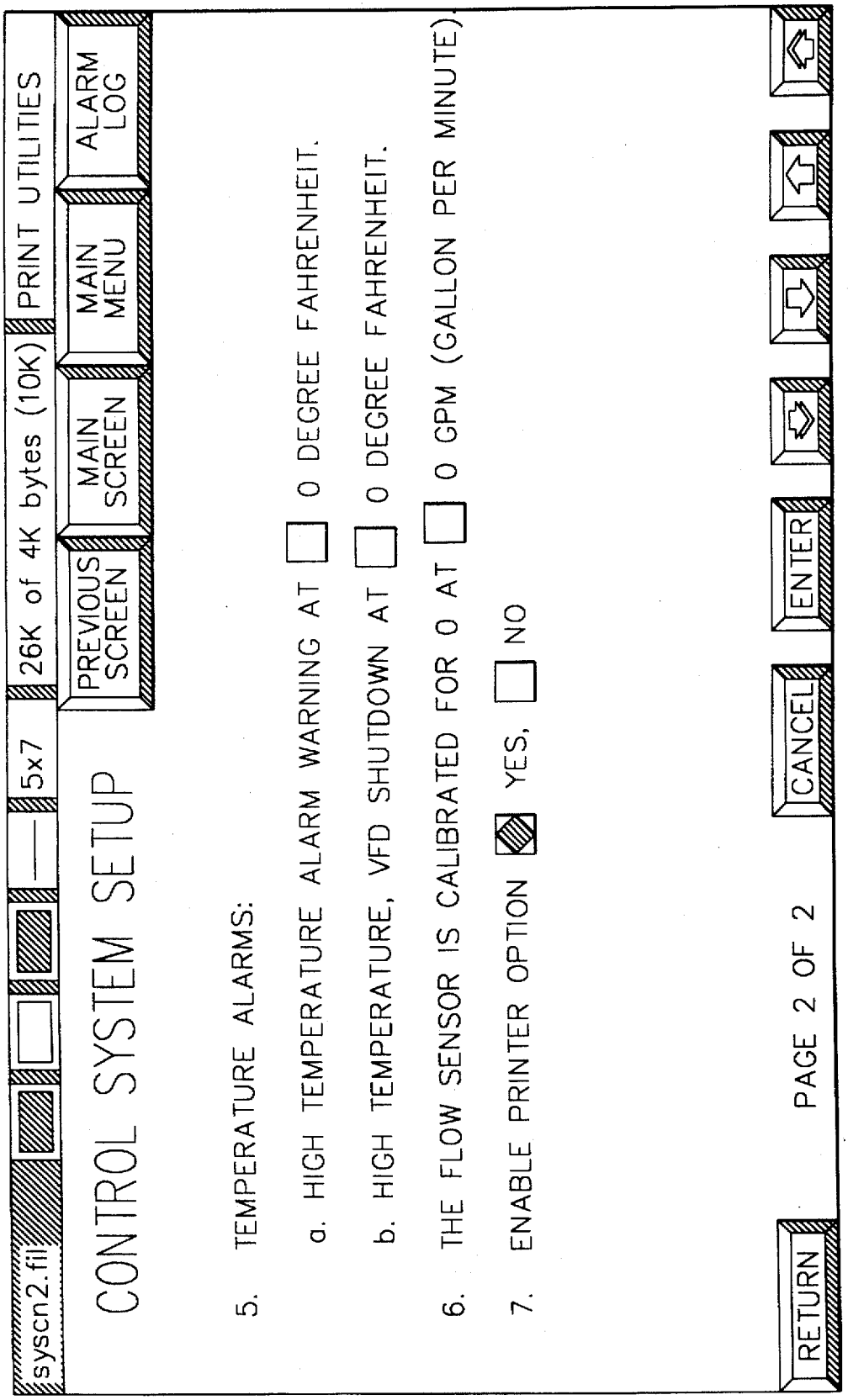

| levsup.fil | ▨ | ▨ | ☐ | — | 5x7 | 24K of 4K bytes (8K) | PRINT UTILITIES |

| PREVIOUS SCREEN | MAIN SCREEN | MAIN MENU | ALARM LOG |

LEVEL SETUP

1. HIGH LEVEL ALARM AT ☐ 0.00 FEET.
2. LOW LEVEL ALARM AT ☐ 0.00 FEET (RESET AT STOP PUMPS LEVEL).
3. STOP PUMPS AT LOW LEVEL ALARM WHILE OPERATING IN MANUAL MODE— ▨ YES, ☐ NO.

4. LEAD PUMP SETUP:
   a. STOP PUMP AT ☐ 0.00 FEET.
   b. START VFD AT ☐ 0.00 FEET, AT THE MINIMUM SPEED OF ☐ 0.00 %.
   c. INCREASE THE SPEED TO 0.00 % AS THE LEVEL REACHES ☐ 0.00 FEET.
   d. START ACL (BYPASS) AT ☐ 0.00 FEET, IF NO HIGH RUN VERIFICATION.

5. LAG1 PUMP SETUP:
   a. STOP PUMP AT ☐ 0.00 FEET.
   b. START VFD AT ☐ 0.00 FEET, AT THE MINIMUM SPEED OF ☐ 0.00 %.
   c. INCREASE THE SPEED TO 0.00 % AS THE LEVEL REACHES ☐ 0.00 FEET.
   d. START ACL (BYPASS) AT ☐ 0.00 FEET, IF NO HIGH RUN VERIFICATION.

PAGE 1 OF 2

| CONTINUE | CANCEL | ENTER | ⇨ | ⇨ | ⇨ | ⇦ | ⇧ |

FIG. 16(a).

pumsup2.fil | — | 5x7 | 23K of 4K bytes (8K) | PRINT UTILITIES

PUMP SETUP

[PREVIOUS SCREEN] [MAIN SCREEN] [MAIN MENU] [ALARM LOG]

1. ALLOW THE FOLLOWING MODES OF PUMP OPERATION:
   a. PUMP 1 VFD MODE ▨ YES,  ☐ NO;  ACL (BYPASS) MODE ▨ YES,  ☐ NO
   b. PUMP 2 VFD MODE ▨ YES,  ☐ NO;  ACL (BYPASS) MODE ▨ YES,  ☐ NO
   c. PUMP 3 VFD MODE ▨ YES,  ☐ NO;  ACL (BYPASS) MODE ▨ YES,  ☐ NO
   d. PUMP 4 VFD MODE ▨ YES,  ☐ NO;  ACL (BYPASS) MODE ▨ YES,  ☐ NO

2. STANDBY PUMP CONFIGURATION:
   a. PUMP ▨ 0 IS THE STANDBY PUMP (0 = NO STANDBY PUMP).
   b. THE STANDBY PUMP WILL:
      (1) BE ENABLED ONLY TO REPLACE A FAILED PUMP ▨ YES
      (2) START ONLY IF AT STANDBY START LEVEL ☐ YES
   c. THE STANDBY PUMP IS ALLOWED TO RUN IN THE FOLLOWING MODE:
      (1) VFD ONLY  ☐ YES
      (2) ACL (BYPASS) ONLY  ☐ YES
      (3) EITHER VFD OR ACL WHICHEVER IS MORE APPROPRIATE ☐ YES

PAGE 1 OF 2

[CONTINUE]   [CANCEL] [ENTER]

FIG. 17(a).

BUBBLER SETUP bubb_sup.fil | 5x7 | 23K of 4K bytes (16K) | PREVIOUS SCREEN | MAIN SCREEN | MAIN MENU | PRINT UTILITIES | ALARM LOG 1. AIR COMPRESSOR ALTERNATION (CHOOSE ONE):
   ⊠ a. UNEVEN ALTERNATION
   (A/C #1 Runtime = 4 Hours, A/C #2 Runtime = 1 Hour)

⊠ b. EVEN ALTERNATION
   (A/C #1 Runtime = 4 Hours, A/C #2 Runtime = 4 Hours)

⊠ c. MANUAL ALTERNATION
   The Primary A/C Is: ⊠ #1   ⊠ #2
   The Standby A/C Is: ⊠ #1   ⊠ #2

2. IS THE BUBBLER TUBE BLOWDOWN OPTION AVAILABLE ⊠ YES, ☐ NO
   a. IF AVAILABLE, ENABLE AUTO BLOWDOWN: ⊠ YES ☐ NO
   b. BLOWDOWN AUTOMATICALLY EVERY ⊠ 0 HOURS.

CANCEL | ENTER

FIG. 18.

| blower_s.fil | | | 5x7 | 25K of 4K bytes (16K) | PRINT UTILITIES |
|---|---|---|---|---|---|

| PREVIOUS SCREEN | MAIN SCREEN | MAIN MENU | ALARM LOG |
|---|---|---|---|

BLOWER SETUP

1. BLOWER ALTERNATION (CHOOSE ONE):
   a. UNEVEN ALTERNATION (EVERY 4 HOURS RUN THE STANDBY BLOWER FOR ONE HOUR) ☒ YES
   b. EVEN ALTERNATION (ALTERNATE EVERY FOUR HOURS)— ☐ YES
   c. MANUAL ALTERNATION — ☐ YES    NORMAL= ☒ #1    ☒ YES
                                     STANDBY= ☒ #1    ☐ #1
                                                      ☒ #1

2. CFM ALARM (CLOSE DOORS):
   a. LOW AIR FLOW ALARM AT OR BELOW ☐ 0 CFM (BASED ON HIGH SPEED PERATION). SOFT ALARM AFTER ONE HOUR.

3. CABINET PRESSURE ALARM (CLOSE DRS):
   a. LOW CABINET PRESSURE AT OR BELOW ☐ 0.00 INCHES H2O (BASED ON LOW SPEED OPERATION). SOFT ALARM AFTER ONE HOUR.

4. RUN BLOWER HIGH SPEED IF TEMPERATURE RISES ABOVE ☐ 0 DEGREE FAHRENHEIT.

| CANCEL | ENTER | ⇦ | ⇩ | ⇧ | ⇨ |
|---|---|---|---|---|---|

FIG. 19.

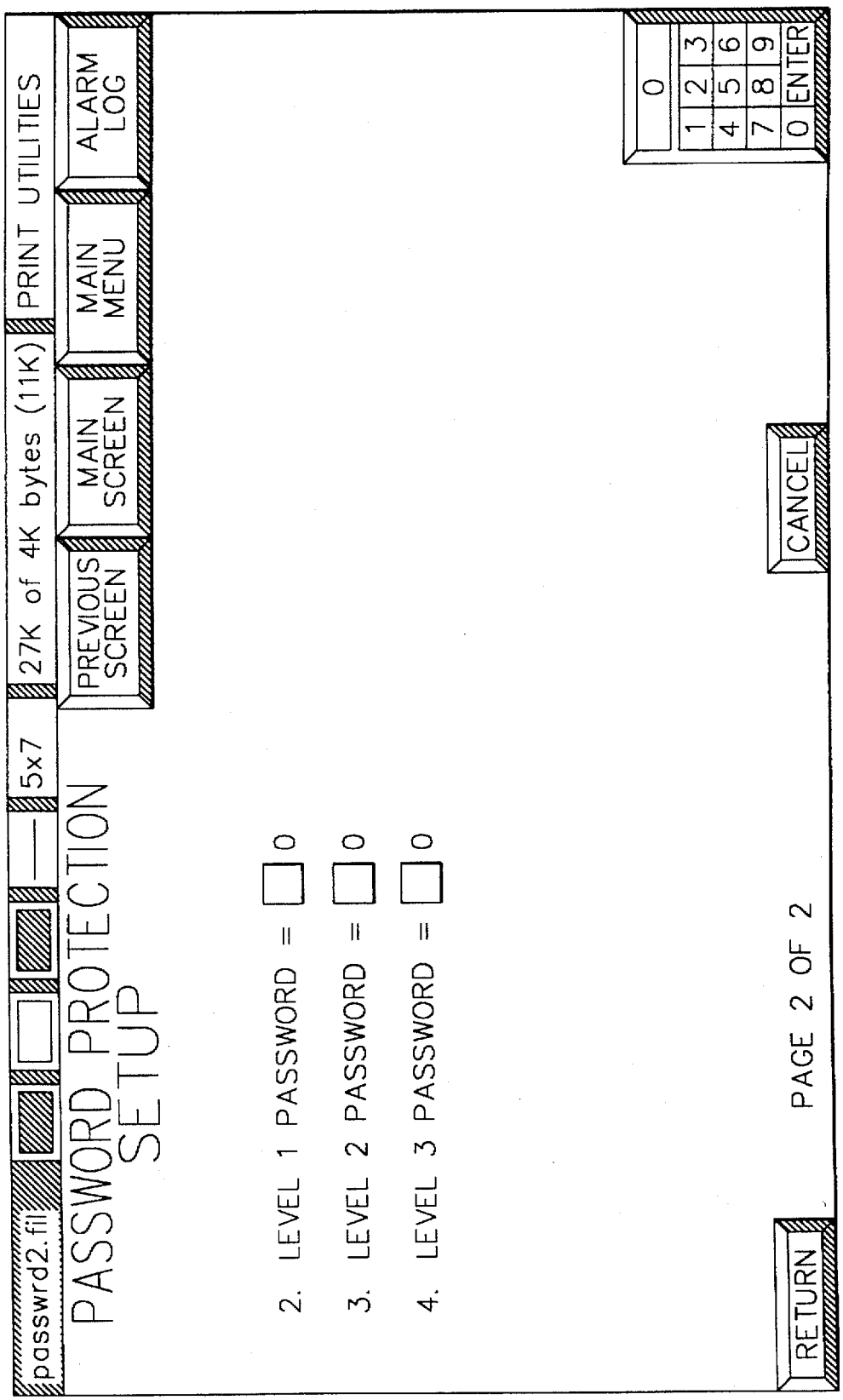

FIG. 26(a).

EXAMPLE OF POTENTIAL SAVINGS WITH NO STATIC
(100% DYNAMIC HEAD)
(NOT A REAL WORLD SITUATION)

INFLOW=500 GPM (CONSTANT)
START PUMP 5'-0"
STOP PUMP 5'-0"
GRADE
WET WELL
PUMP
10" ID PIPE 4000 FT. LONG
C=130
STATIC HEAD=0 FT.
ELECTRIC RATE=.08/KWH

| OPTION A (CONSTANT SPEED OPERATION) | OPTION B (VARIABLE SPEED OPERATION) |
|---|---|
| PUMP AT 1500 GPM<br>OVERALL EFFICIENCY=55% | PUMP AT 500 GPM CONTINUOUSLY<br>OVERALL EFFICIENCY=50% |
| $DYHD = \dfrac{.002083(4000)(100/130)^{1.85}(1500)^{1.85}}{4.8655^{10}}$<br>$= 52.51$ FT<br>HHP=.002521(1500 GPM)(0+52.51 FT)<br>$= 19.86$<br>BHP=19.86/.55=36.1 HP<br>ANNUAL OPERATING COST<br>$\left[36.1 \times .746 \text{ KW}\right]\left(\dfrac{24}{3} \times 365\right)(.08)$<br>$= \$6,290.85$<br>*1HP=.746 KW | $DYHD = \dfrac{.002083(4000)(100/130)^{1.85}(500)^{1.85}}{4.8655^{10}}$<br>$= 6.88$ FT<br>HHP=.002521(500 GPM)(0+6.88 FT)<br>$= .87$<br>BHP=.87/.50=1.73 HP<br>ANNUAL OPERATING COST<br>$\left[1.73 \times .746 \text{ KW}\right]\left(\dfrac{24}{1} \times 365\right)(.08)$<br>$= \$904.03$ |
| ANNUAL ENERGY COST<br>1500 GPM CONSTANT SPEED ENERGY COST   6,290.99<br>500 GPM VARIBLE SPEED ENERGY COST     904.44<br>$\overline{\$5,386.55}$ (85.6%) | |

SUMMARY OF FORMULAS

GIVEN:
DYHD = DYNAMIC PIPE FRICTION HEAD (FEET)
L = PIPE LENGTH IN FEET
FLOW = MEASURED IN GALLONS PER MINUTE (GPM)
d = PIPE I.D. IN INCHES
HHP = HYDRAULIC HORSEPOWER
BHP = BRAKE HORSEPOWER

TOTAL HEAD = STATIC + DYNAMIC HEAD (IN FEET)
OVERALL EFFICIENCY = PUMP EFFICIENCY x MOTOR EFFICIENCY
HAZEN-WILLIAMS FORMULA FOR DISCHARGE OF PIPE FRICTION (EXPONENT=1.85)
c = PIPE FRICTION CO-EFFICIENT (TYPICALLY 100 TO 140)

AFFINITY LAWS:

$$\frac{FLOW_1}{FLOW_2} = \frac{RPM_1}{RPM_2} \qquad \frac{PRES_1}{PRES_2} = \left(\frac{RPM_1}{RPM_2}\right)^2 \qquad \frac{HP_1}{HP_2} = \left(\frac{RPM_1}{RPM_2}\right)^3$$

FORMULAS:

(1) $DYHD = .002083 \times L \times \dfrac{\left(\frac{100}{c}\right)^{1.85} \times (FLOW)^{1.85}}{d^{4.8655}}$ (2) $HHP = (.0002521) \times (FLOW) \times (TOTAL\ HEAD)$
$= (.0002521) \times (FLOW) \times (STATIC + DYNAMIC\ HEAD)$
$= (.0002521) \times (FLOW) \times \left[STATIC + \dfrac{.002083 \times L \times \left(\frac{100}{c}\right)^{1.85} \times (FLOW)^{1.85}}{d^{4.8655}}\right]$ (3) $BHP = \dfrac{HHP}{OVERALL\ EFFICIENCY} \qquad TYPICALLY\ \dfrac{HHP}{.55}$

NOTE #1:
GENERAL (REFERENCE #2, #3 ABOVE)
$BHP = K \times (FLOW)^{2.85} + K' \times (FLOW)$

NOTE #2:
BHP IS PROPORTIONAL TO THE 3rd POWER (I.E., 2.85) OF FLOW

NOTE #3:
TYPICAL VFD EFFICIENCY = 95%

FIG. 26(b).

PUMP STATION CONTROL SYSTEM AND METHOD

BACKGROUND OF THE INVENTION

1. Field of the Invention

The present invention relates to the pumping of liquids, and, more particularly, to control systems and methods for pumping wastewater.

2. Description of Related Art

In a typical fluid-pumping application the goal is to maintain the quantity of fluid in a vessel. One or more pumps are used to compensate for inflows or outflows caused by events external to the system, and these pumps are selectively activated and controlled to maintain the state of the system within a predetermined range.

In the example of a wastewater lift station, wastewater flows into a wet well from sources such as residences, roadway drains, or other lift stations. One or more pumps remove water from the wet well as necessary to maintain the level within predetermined limits. Transducers can measure wet-well level, wet-well outflow from or inflow to each pump, flow through inlet or outlet pipes shared by multiple pumps, power input to the system or to individual pump motors, and other operating parameters. There may be one or more check valves in parallel or in series with each pump. When the station includes multiple pumps, they are usually in a parallel orientation.

The transducers and pump motors are connected to a pump station control system, which includes motor starters for starting and stopping the motors in response to operating conditions. The control system also includes alarms, displays, logic circuitry ranging from relays to microprocessors, and disk drives and/or semiconductor memory for storing data and programs. The control system can also include means for communicating, such as by radio or land-line telemetry, with a remote monitoring system. The information to be communicated can include data or calculated parameters that characterize the operating conditions of the lift station, desired control parameters, alarms, and desired changes in the program to control the system.

The control apparatus and methods used in pumping stations are generally focused on maintaining desired operating conditions reliably, but without specifically addressing or even calculating operating efficiencies and/or costs. For example, in a typical wastewater lift station one pump is turned on when the water in the wet well reaches a preset "pump start" level and is turned off at a preset (lower) "pump stop" level. If the pump has a variable-speed drive, the pump is initially activated at a preset "start speed" that is less than 100% of the pump's rated speed. The pumps, control levels, and control speeds are usually chosen such that the starting pump outflow exceeds the average inflow, and therefore the wet-well level begins to fall as soon as the pump is activated. The typical operating pattern thus includes intermittent pump operation, with the wet-well level cycling between the "pump start" and the "pump stop" levels. In this operating mode the pump duty cycle increases or decreases with flow, but the number of pumps and pump speed are constant during each "on" portion of the cycle. At times of higher inflow, however, it may be desirable to increase outflow by increasing pump speed or activating additional pumps in parallel with the lead pump. For example, the lead pump outflow may simply be insufficient to keep up with the inflow. The system typically detects this condition because the wet-well level continues to rise even after lead pump activation.

There are numerous methods for selecting the pump speed or pumps to be activated, which can dramatically affect pump station energy consumption, generally a major operating cost. In most lift stations, however, the control system does not even calculate an efficiency parameter. For example, in multipump systems the control system usually alternates between pumps for each on-off cycle.

In variable-speed systems pump speed is generally a linear function of level above the "pump start" level. While previously known systems calculate efficiency parameters, the methods do not effectively optimize efficiency.

In other art areas, computer-driven control systems and methods are known that monitor a plurality of operating parameters for the purpose of controlling some or all of these operating parameters to optimize a particular parameter, such as efficiency. Additionally, it is known to provide time histories of such parameters for maintenance and diagnostic purposes.

Such systems include those disclosed by Juhasz et al. (U.S. Pat. No. 4,258,421), directed to a vehicle monitoring and recording system; Teass et al. (U.S. Pat. No. 4,459,671), directed to a fuel management control system; Kugler (U.S. Pat. No. 4,916,628), directed to a control and status monitoring system for power generating stations; Crane (U.S. Pat. Nos. 4,843,575 and 4,334,425), directed to an interactive dynamic real-time management system for improving the operating efficiency of powered systems; Julovich (U.S. Pat. No. 4,642,992), directed to a method for maximizing the efficiency of cooling pumps in a power generating plant; Colovas et al. (U.S. Pat. No. 4,475,380), directed to a fuel efficiency monitor;

Systems specifically directed to fluid-flow control include those disclosed by Battah (U.S. Pat. Nos. 4,486,148 and 4,330,237), directed to a method of controlling a motive power and fluid driving system; and Bartley et al. (U.S. Pat. No. 4,108,574), Crane (U.S. Pat. No. 4,584,654), and Martin (U.S. Pat. No. 4,835,687), directed to monitoring and control of piping systems. Pump systems in particular are addressed by McClain et al. (U.S. Pat. No. 4,370,098), Shiraishi et al. (U.S. Pat. No. 4,178,132), Rishel (U.S. Pat. No. 4,805,118), Palmu et al. (U.S. Pat. No. 4,999,117), Mabe (U.S. Pat. No. 5,240,380), Gill (U.S. Pat. No. 5,092,739), Prevett (U.S. Pat. No. 3,744,932), and Corso et al. (U.S. Pat. No. 4,120,033).

Two types of efficiency parameters have been known in the art: the power ratio and the material throughput per unit energy. All of the types of power ratio used thus far measure the rate of work output by the powered system and the power consumed by the system and taking the ratio thereof.

A longstanding practice in the wastewater pumping industry is to use the "wire-to-water efficiency" as a measure of the efficiency of a pumping system (Rishel '118, Corso '033). This term is defined as the (hydraulic horsepower output of the pump divided by the electric horsepower input to the pump motor) times 100. Since electric horsepower decreases with a decrease in pump speed, it has been assumed that energy costs would also decrease. Therefore, the wire-to-water efficiency has been deemed to be the best measure of energy efficiency and effective pump speed.

The fluid volume pumped per unit energy, the second type of efficiency parameter, comprises a measure of the throughput efficiency. Efficiency values are taught to be calculated and displayed in a pipeline system by Crane (U.S. Pat. No. 4,584,654).

SUMMARY OF THE INVENTION

It is an object of the present invention to provide a monitoring and control system and a method for interfacing between an operator and a pump station controller.

It is a further object to provide such a monitoring and control system and a method that include means for tracking a plurality of system parameters over a predetermined time period.

It is an additional object to provide such a monitoring and control system that includes a plurality of real-time information screens accessible by the operator.

It is another object to provide such a monitoring and control system and method that sense a plurality of system parameters, performs diagnostic checks, and issues alarms when determined to be necessary.

It is yet a further object to provide such a control system and method that include menu-driven programmable logic control that permits an operator to alter the system configuration.

It is also an object to provide a control system and method that enable the prediction and the optimization of a system parameter.

It is yet another object to provide a control system that minimizes the training needed for an operator.

It is a further object to provide a control system that improves efficiency and thus minimizes operating costs.

It is also an object to provide a control system that can monitor and manage pump station operations remotely.

It is another object to provide a control system that can monitor and manage the operations of a plurality of pump stations remotely.

The monitoring system of the present invention is specifically directed to monitoring the operating parameters of a pump station that has a fluid pump. The system comprises means for sensing a plurality of operating parameters of the pump station. Such operating parameters may include such data as pump status (off/on), pump speed, and fluid quantity in a vessel. In addition, there are provided means for transmitting the operating parameters from the sensing means to an operator in real time. This feature permits the operator, whether on site or remote from the station, to be aware of all sensed parameters essentially instantaneously, such as a pump shutting off or an alarm being issued on an element of the station.

A further element of the monitoring system comprises means for storing the sensed operating parameters at predetermined time intervals over a predetermined period of time. Thus a time history of the system's operating parameters can be stored so that calculations may be performed to provide the operator with information such as pump cycles and amounts of fluid pumped over time. Also, in communication with the storing means, a means for displaying this time history is provided in order to present a digital or graphical representation of the operating parameters over a desired time range. As a particular example, for instance, if a pump station employs more than one pump, a graph of each pump's duty cycle could be displayed over, say, a month, providing an indication of the work performed by each pump.

The monitoring system in one embodiment may further comprise means for calculating a real-time cost parameter of the system from the sensed operating parameters. This cost parameter may take the form of energy usage per quantity of fluid pumped, which can then be translated into a monetary cost. Utilizing the time history already stored, a prediction of the cost parameter can be calculated over a predetermined period of time. For example, a calculation could be made of energy usage and cost associated therewith for the coming year.

A further embodiment of the monitoring system comprises means for predicting the failure of an element of the pump station. This prediction can be made from a correlation of the real-time operating parameters with the time history of the operating parameters and with predetermined derived operating parameters. For example, a pump failure may be predicted by examining the energy usage of that pump over time as compared with its output. If the pump's efficiency is seen to be dropping, this may be indicative of a problem with that pump, which can then be taken off line for preventive maintenance prior to a catastrophic failure.

Yet another embodiment of the monitoring system comprises means in communication with the storing means for changing a pump's selection priority (i.e., lead vs. lag) upon a comparison of the real-time operating parameters with predetermined acceptable ranges of operating parameters. In this way, the system is protected from the impact of such occurrences as power surges and motor overloads.

Another element of an embodiment of the system comprises means for calculating the real-time cost parameter over cyclic flows, as are typically experienced in wastewater and fresh-water pumping applications.

In addition to providing a real-time monitoring system, the present invention provides a control system for interfacing between an operator and a pump station. As above, the system comprises sensing and communicating means. In order to include the control aspect of this embodiment, however, means are also provided for the operator to communicate a control signal to the pump station to effect a change in an operating parameter.

As with the above embodiments for the monitoring system, this control system further comprises means for calculating from the sensed parameters a real-time cost parameter of the system and means for displaying the cost parameter to the operator. In addition, the control system comprises means for calculating a potential optimized cost parameter from the sensed parameters and the real-time cost parameter. This optimized cost parameter could take the form of an energy cost, for instance. The system can then calculate and display to the operator a recommended change in an operating parameter needed to achieve the optimized cost parameter. In the case of an energy cost, for example, it might be recommended to pump more slowly, or to place on line an additional pump to save energy.

The present invention further comprises an interactive interface and display system for providing communication between an operator and a pump station. As above, the pump station is provided with a plurality of sensors for sensing a plurality of operating parameters. The system in this configuration comprises a processor, means for transmitting the operating parameters from the pump station to the processor, and means resident in the processor for performing real-time calculations on the operating parameters to provide an efficiency parameter. The system further comprises means in communication with the processor for storing time histories of the operating parameters at predetermined time intervals and of the efficiency parameter over a predetermined period of time. Finally, the system comprises visual display means in communication with the processor for displaying the operating parameters and the efficiency parameter in real time and for displaying the time histories of the operating parameters and efficiency variable.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 6 illustrates a pump status screen.

FIG. 9(a)–9(d) illustrate flow and energy history screens for the following time periods: (a) daily; (b) weekly; (c) monthly; and (d) yearly.

FIG. 15(a)–15(b) illustrates (a) the first and (b) the second screens of the control system setup option.

FIG. 16(a)–16(b) illustrates (a) the first and (b) the second screens of the level setup option.

FIG. 17(a)–17(c) illustrates (a) the first, (b) the second, and (c) the third screens of the pump setup option.

FIG. 18 illustrates the bubbler setup screen.

FIG. 19 illustrates the blower setup screen.

FIG. 22(a)–22(b) illustrates (a) the first and (b) the second screens of the password protection setup option.

FIG. 26(a)–26(b) demonstrates (a) a sample calculation of energy savings realizable with the system of the present invention and (b) a summary of the formulas used for the calculation.

DETAILED DESCRIPTION OF THE PREFERRED EMBODIMENTS

A description of the preferred embodiments of the present invention will now be presented with reference to FIGS. 1–31.

Figure 1:
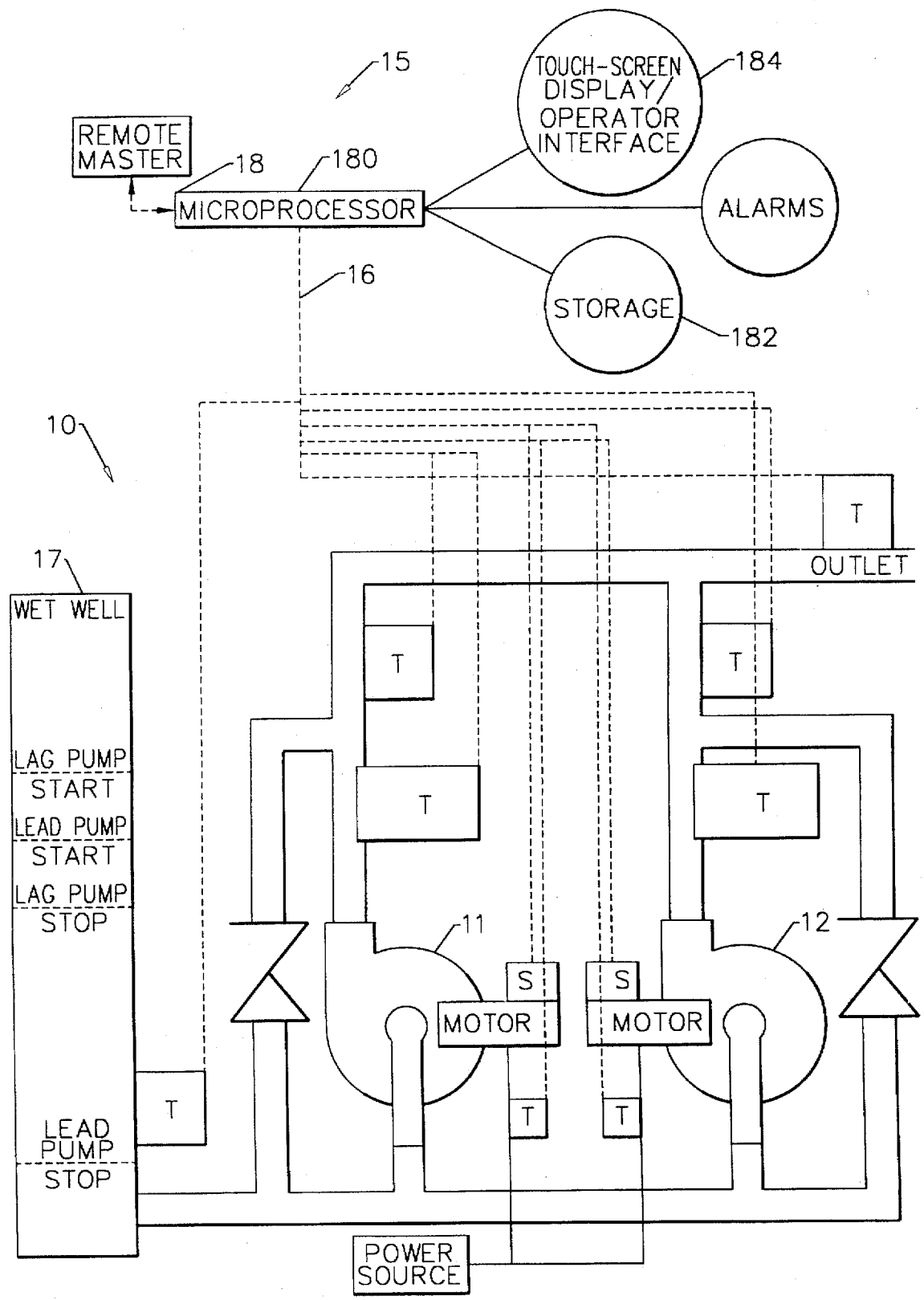
FIG. 1 is a block diagram of the system.

The preferred embodiment of the present system, a block diagram for which is shown in FIG. 1, is utilized to monitor and control up to four pumps, two of which, 11 and 12, are shown to be pad of a municipal lift station for pumping wastewater. This application is not meant to be limiting, however, and the system is also adaptable for use with fresh water and for use with more or fewer pumps.

In FIG. 1, the "T" symbols represent transducers for measuring operating parameters, as discussed above. The "S" symbols adjacent each motor represent starters for the motors.

Figure 2:
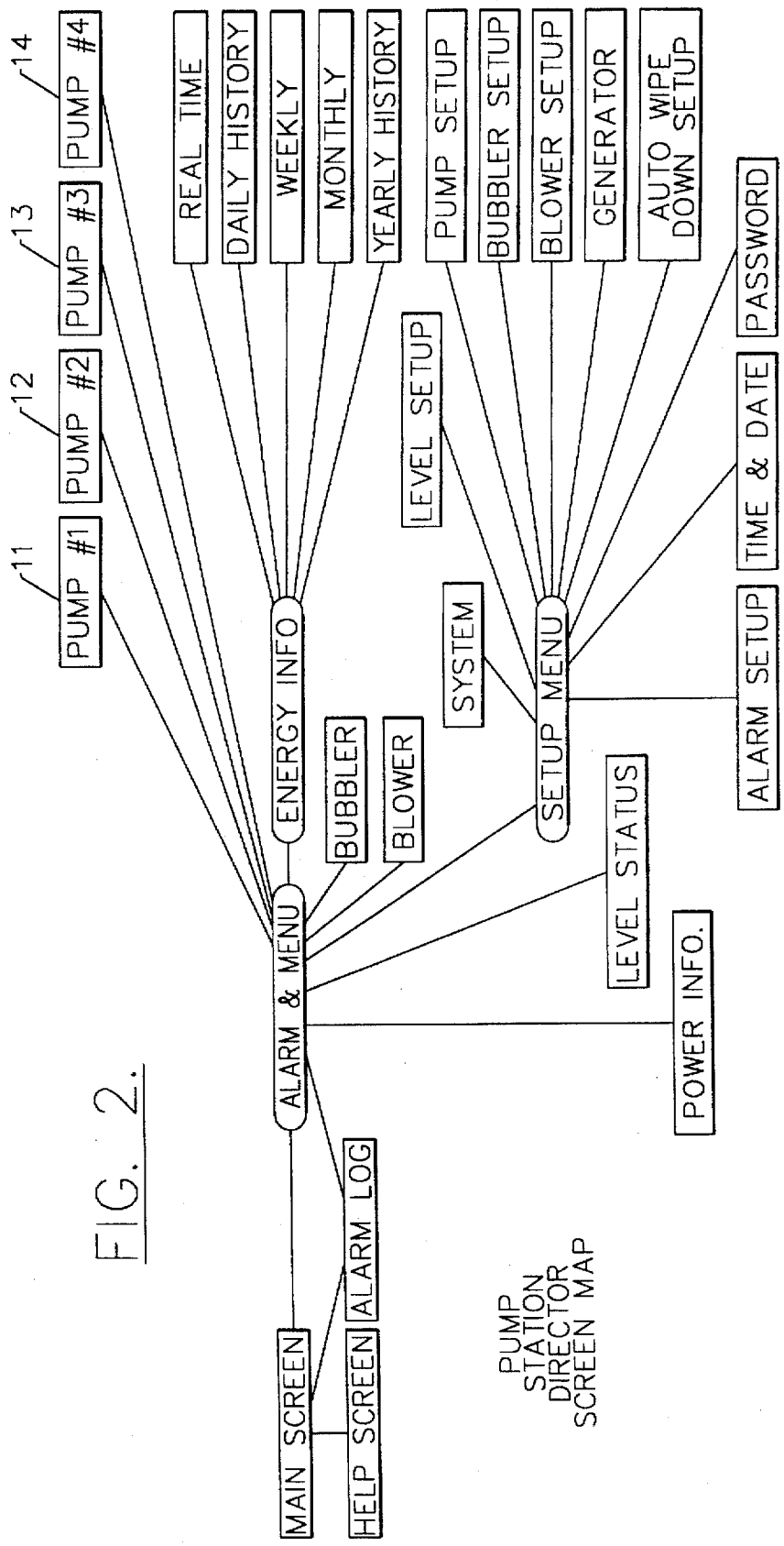
FIG. 2 is a map of the screens of the system.

The system, in both its monitoring and control aspects, is preferably screen based, and FIG. 2, showing a system with four pumps 11–14, is an exemplary map of illustrative system screens to be discussed herein.

The Monitoring System for a Pump Station

The system 15 of the present invention in one aspect is used to monitor the operating parameters of a pump station 10 having a pump, here four pumps 11–14, for pumping a liquid. The system 15 to be discussed herein is directed to a municipal lift station for pumping wastewater from a wet well 17, but is not intended to be limited thereto, and indeed the principles herein are applicable to any fluid pumping system.

The screens that are depicted in FIGS. 3–13 involve the monitoring portion of the system, which comprises means for sensing a plurality of operating parameters of the pump station 10. Such operating parameters may include, but are not limited to, data on such things as liquid level, energy usage, and pump status.

The system also includes means in communication with the sensing means for transmitting the operating parameters to an operator in real time. Such means may include, but are not limited to, cabling 16 such as fiber-optic cables.

Once the operating parameters have been sensed, as well as being transmitted to the operator, they are also communicated to a means for storing them at predetermined time intervals over a predetermined period of time. Such a storage means may include a computer 18 having a CPU 180 and storage device 182.

Means in communication with the storing means are also provided for displaying a time history of the operating parameters. Typically this entails a monitor screen 184 in communication with the computer 18. Monitor screen 184 in a preferred embodiment is a touch screen to facilitate movement between screens and minimize the training needed to utilize the system.

Referring to FIG. 2, the screen system map, one may see the relationships between the screens through which the operator is able to navigate to obtain the desired monitoring data and, as will be discussed in the following sections, to perform control and reconfiguration functions.

Previously disclosed systems have included high-information-content graphical displays at central monitoring locations, but such systems have been too expensive and difficult to use for individual lift stations. Moreover, these displays' information-carrying capacity far exceeded the information considered useful to a lift station operator. The current invention combines a high-information-content graphical display, an easy-to-use touch screen interface, and a new level of lift station hydraulic analysis and data history. The graphical interface represents a huge leap in information capacity, but new capacity confers advantage only with a clear vision for advantageous new content, and for a new interface that allows the operator to master easily the enriched control options. Thus this combination provides unique and surprising improvements in the scope of operating information and capacity for effective control available to lift station operators. The display, interface, and energy management improvements are integrally related. The key advantages of the present invention are a function of the combined improvements.

Figure 3:
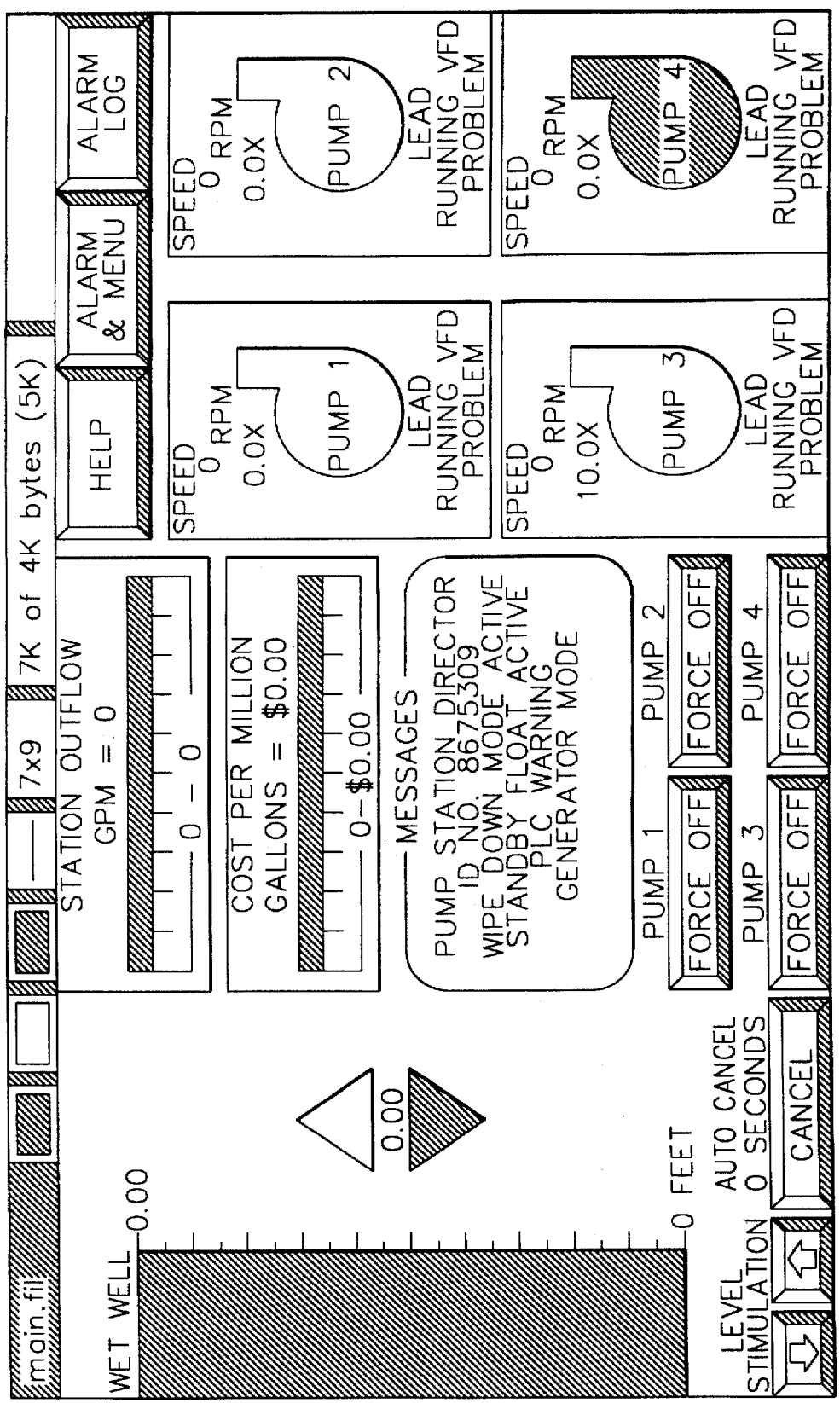
FIG. 3 illustrates the main screen.
Figure 4:
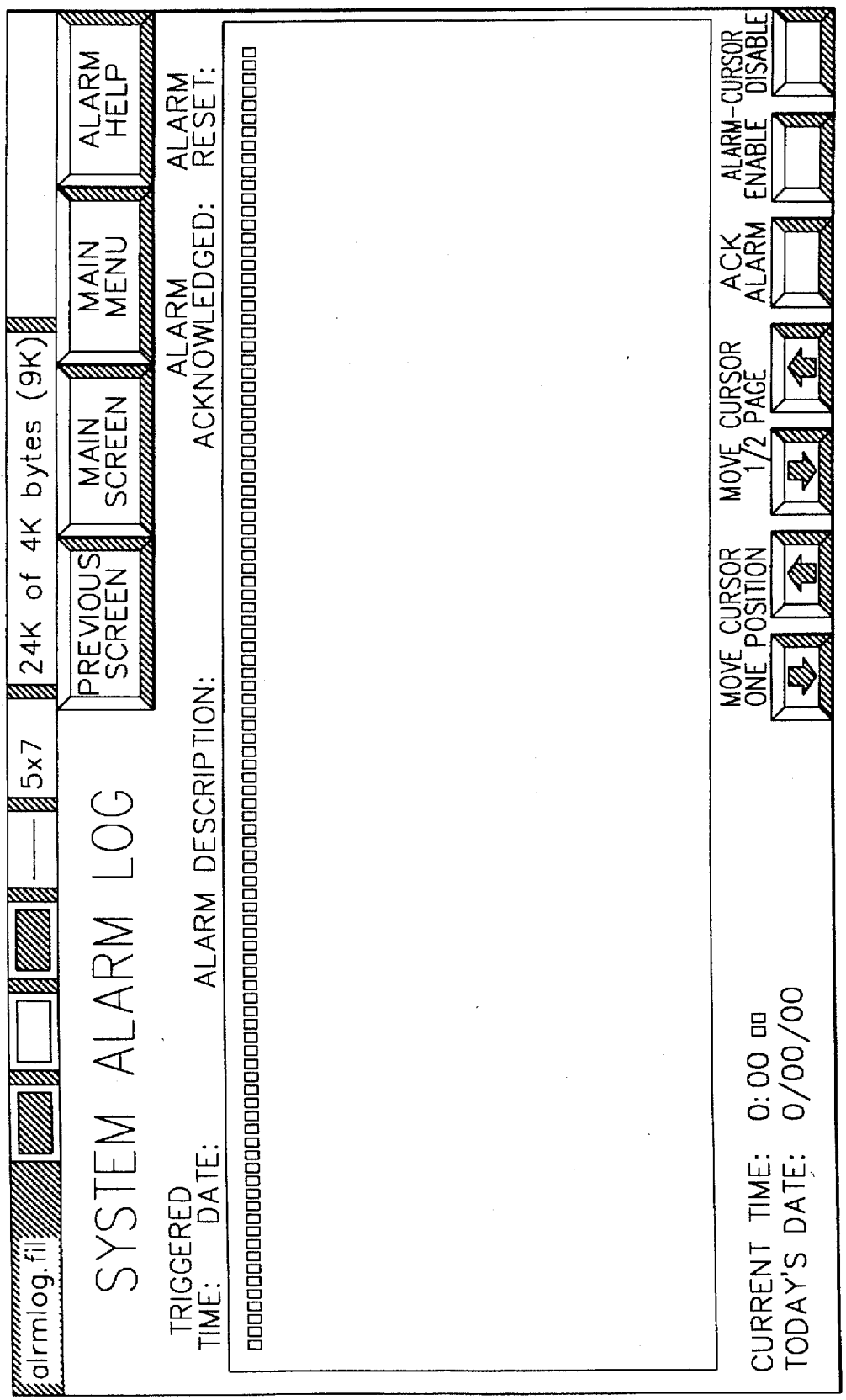
FIG. 4 illustrates the system alarm log screen.

FIG. 3 illustrates the Main Screen visible to the operator upon logging on. This screen provides general system information, including data on each of the four pumps 11–14, liquid level in the wet well 17, gallons per minute being pumped by the station 10, and a factor known as "cost per million gallons," which will be discussed in greater detail below.

The main screen also includes the level simulation function, in which the operator can test critical aspects of system function by simulating a range of levels to confirm activation of alarms, pumps, and pumping speed changes at the appropriate levels.

In another aspect of the invention (screen not shown), the system can allow the operator to initiate automated test sequences under microprocessor control. In a preferred embodiment, the system asks the operator to acknowledge proper system function in response to the test sequences. Moreover, the system memory can record and certify performance of each test, test results, and the identity of the operator, for example, via password.

From the Main Screen the operator may choose to bring up one of three screens: the Help Screen, the Alarm/Menu Screen, or the Alarm Log. The Help Screen (not shown) provides the operator with instructions for using the system.

The Alarm Log Screen (FIG. 4) provides a log of all alarms that have occurred within a predetermined period. Alarms may be tripped by a number of sensed problems, including pump overheating, failure of a bubbler, or excessive vibration. By checking this screen, the operator can determine remotely if a particular piece of equipment may need to be repaired or replaced. This alarm history can be maintained in the computer memory for any desired period of time for system evaluation and comparisons between pieces of equipment. Through the touch screen, the operator can fully reset the alarm or can simply acknowledge the alarm and thereby suppress the alarm signal light or sound without resetting it.

The Alarm/Menu Screen (FIG. 5) primarily serves as an interface to the remaining monitor and control screens. This screen leads directly to most of the status screens, represented in FIGS. 6–13.

Figure 5:
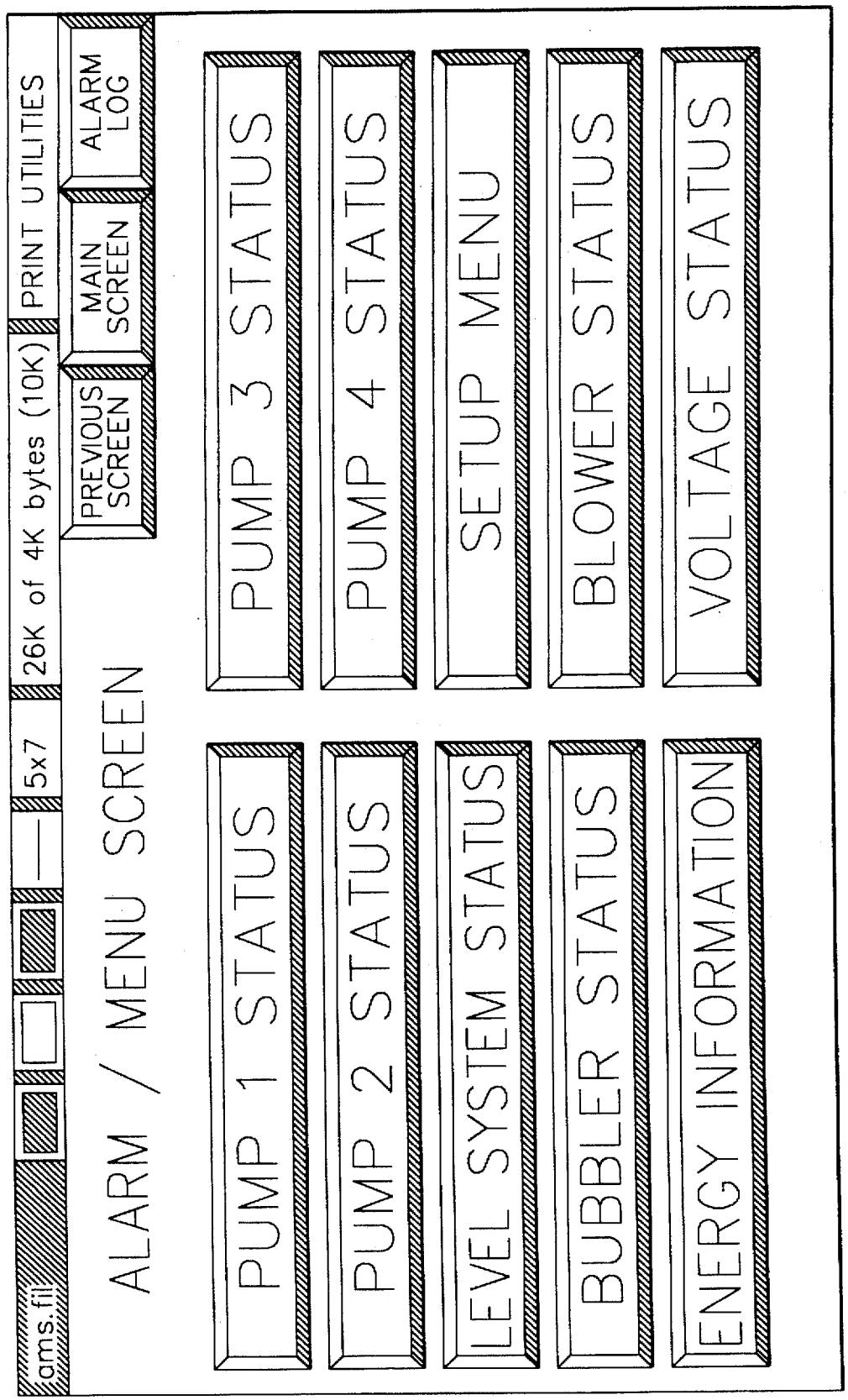
FIG. 5 illustrates an alarm/menu screen.
Figure 7:
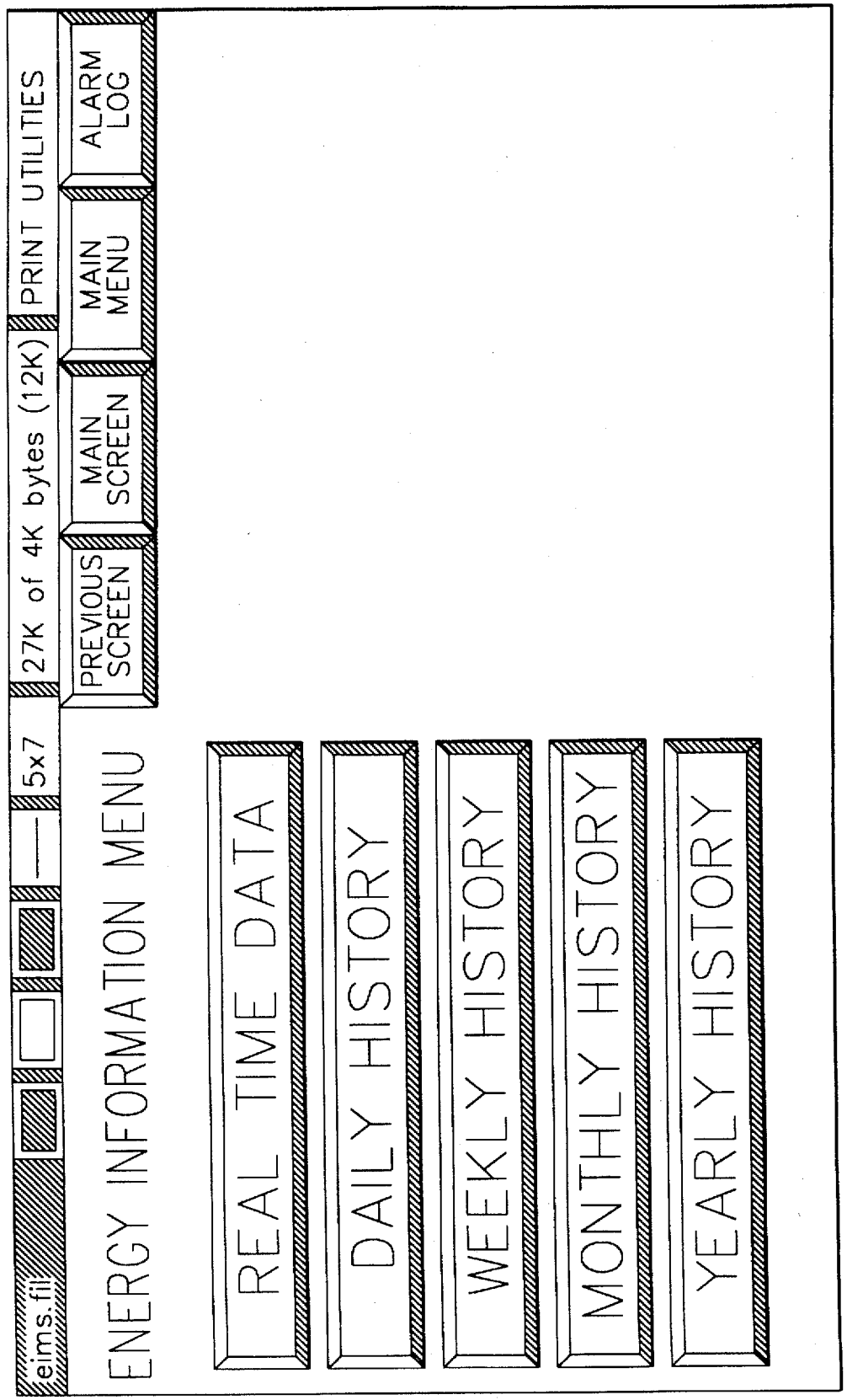
FIG. 7 illustrates an energy information menu screen.

As can be seen from FIG. 5, there is a status screen available for each of the pumps 11–14. A representative of these is shown in FIG. 6 for Pump 212. On the Pump Status Screen are available data on horsepower being utilized, outflow, speed, and variable-frequency drive (VFD) air intake temperature. Additionally, on the lower left are listed a plurality of pump operation indicators. (ACL represents "across the line," or 100% speed.) An arrow next to an item in the list indicates that it has been activated. The lower central and right columns list alarm situations that, when boxed, have been tripped. As indicated, the operator is to press a boxed item once to acknowledge that he/she has seen the alarm and twice to reset the item.

Figure 10:
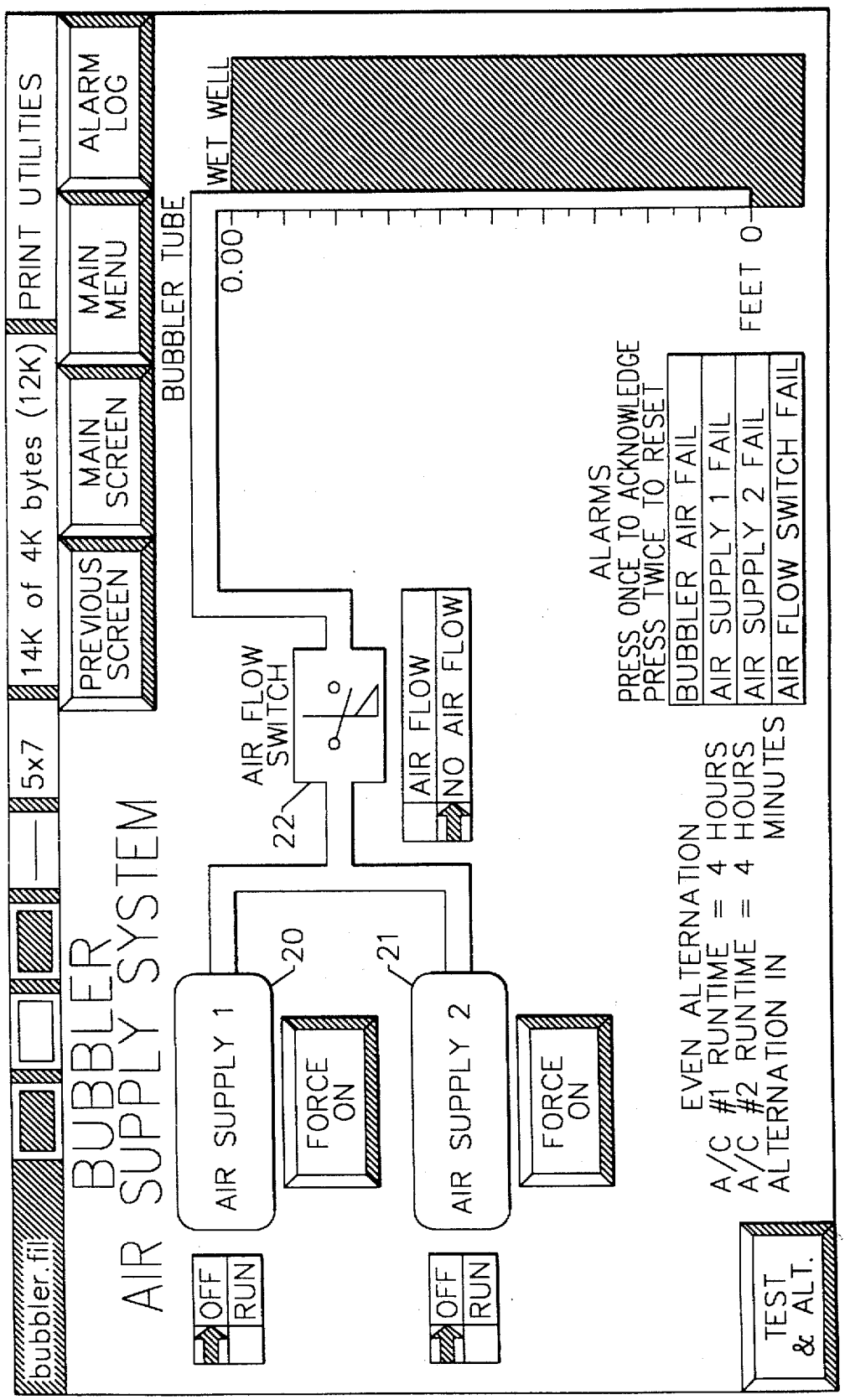
FIG. 10 illustrates the status screen for the bubbler air supply system.

Skipping to FIG. 10, the Bubbler Air Supply System Screen is shown, which provides information on the status of two air supplies 20,21 and the air flow switch 22, as well as the liquid depth in the wet well. A list of alarms is also provided as above.

Figure 11:
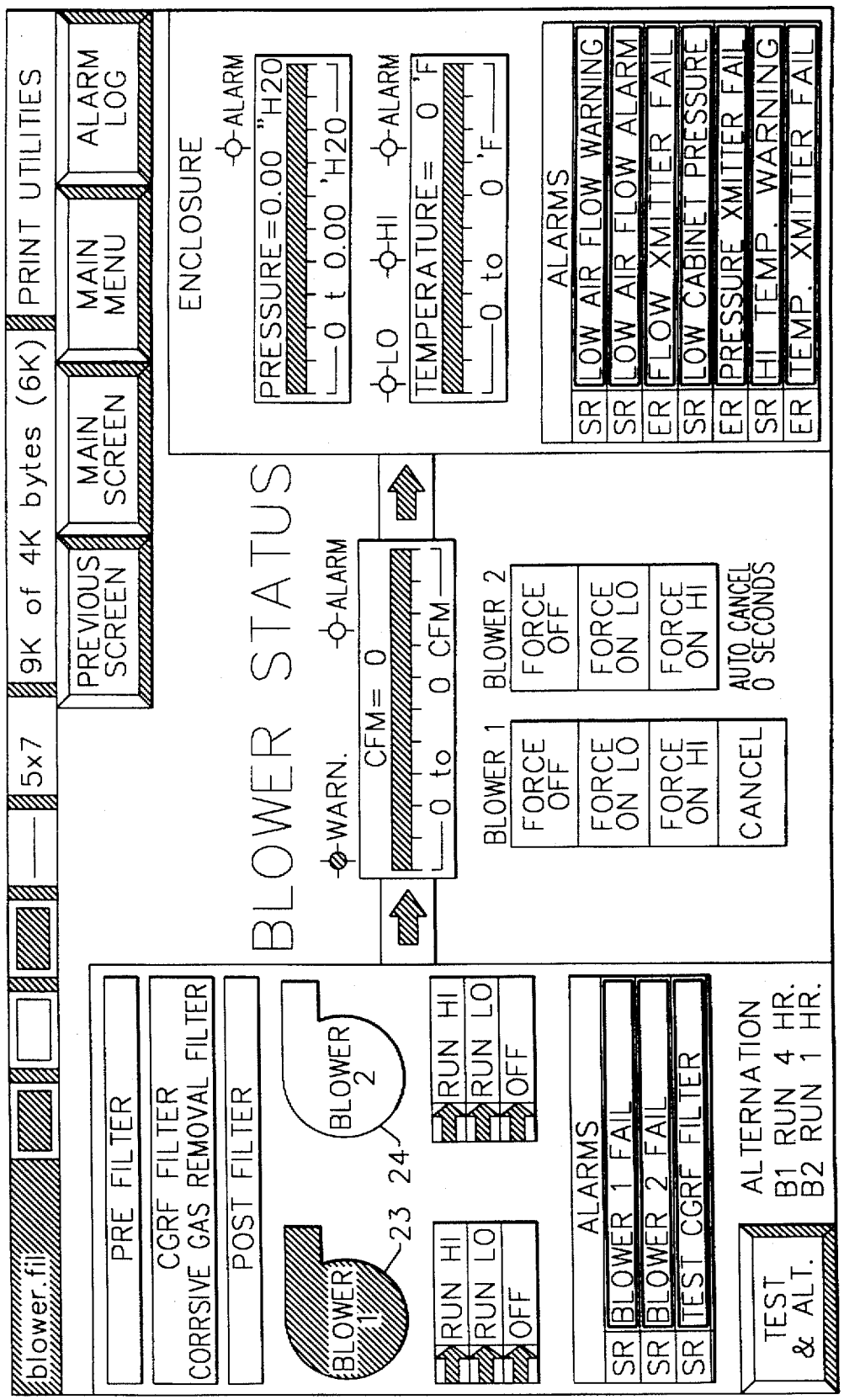
FIG. 11 illustrates a blower status screen.
Figure 12:
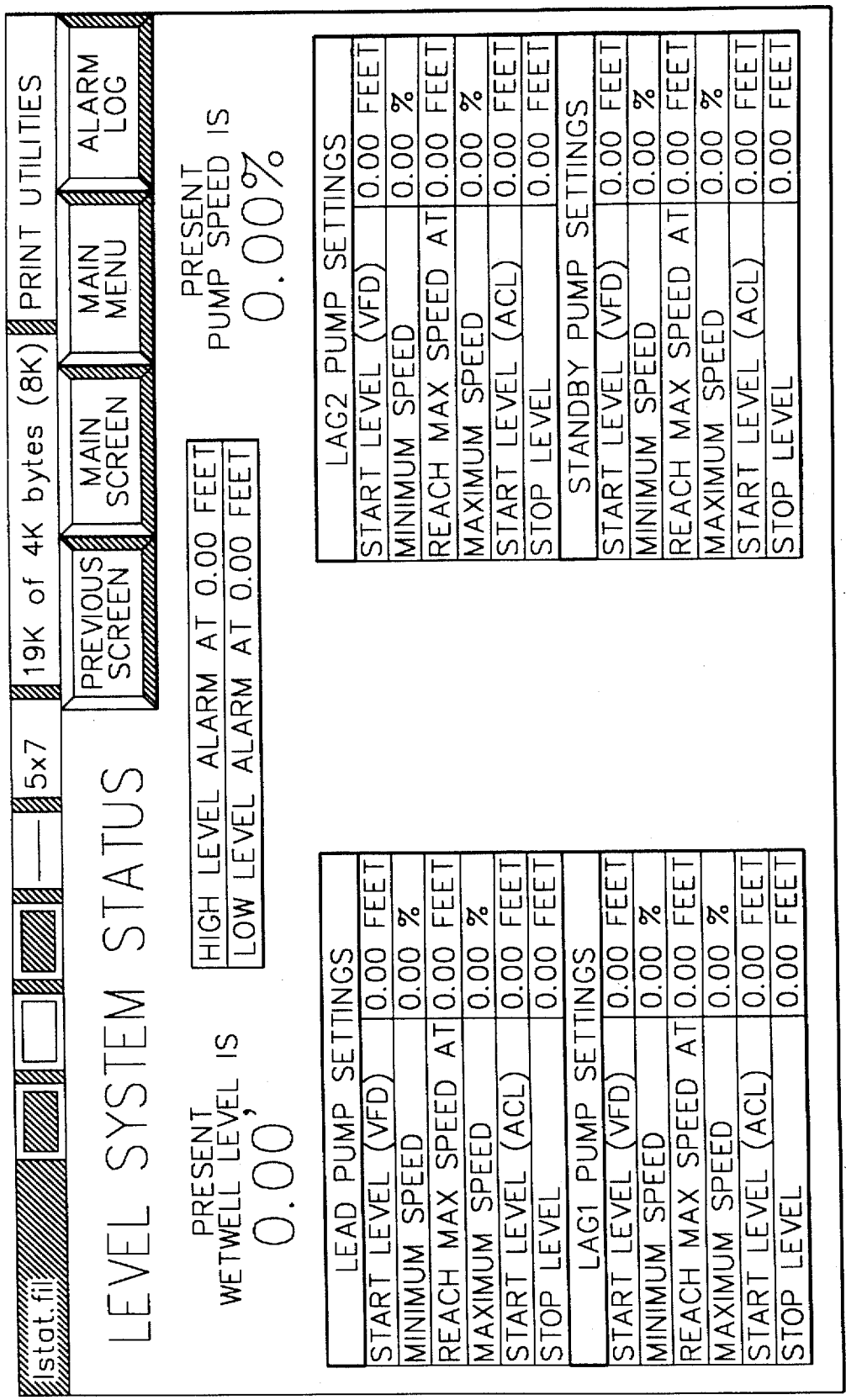
FIG. 12 illustrates a level status screen.
Figure 13:
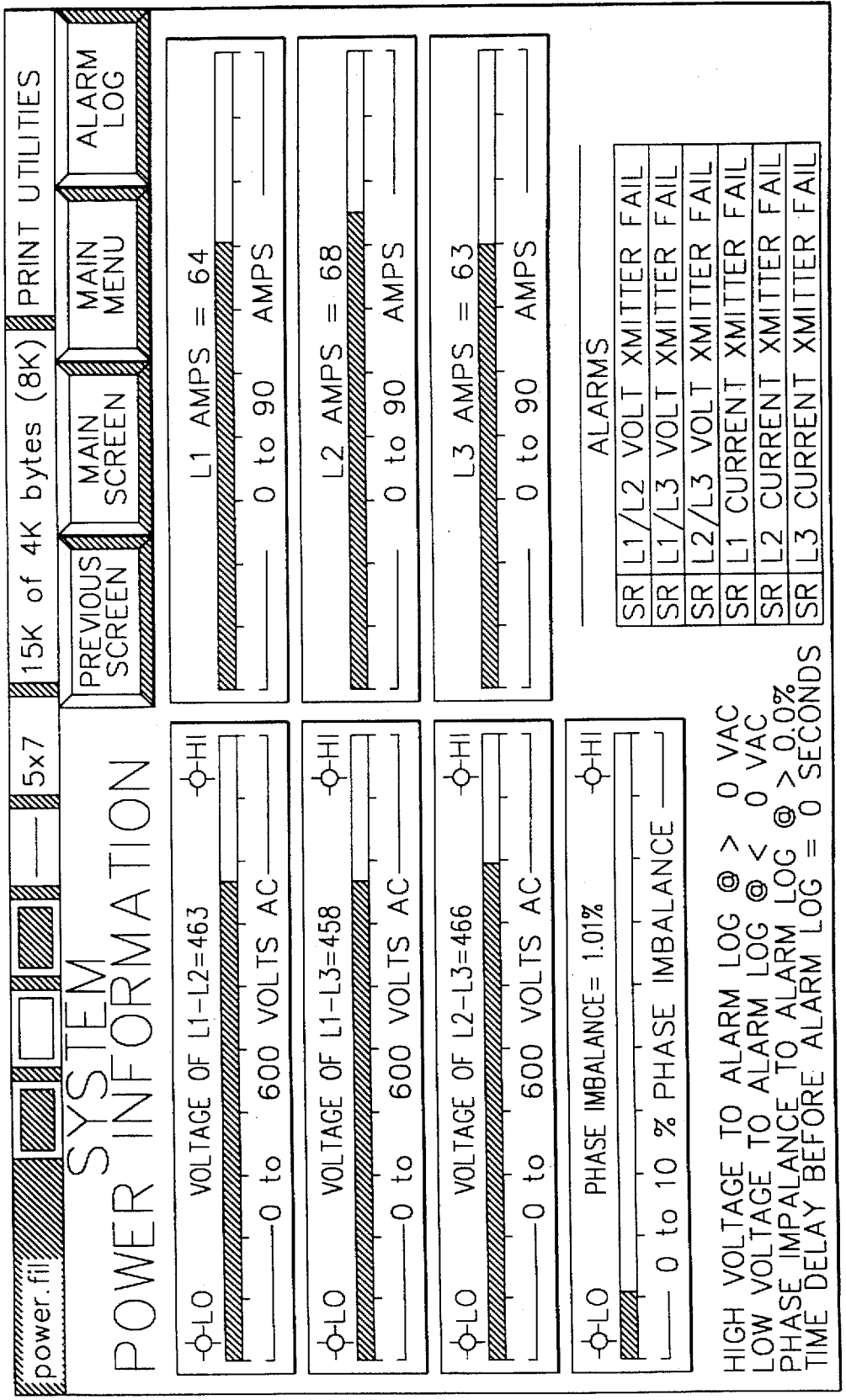
FIG. 13 illustrates a system power information screen.
Figure 14:
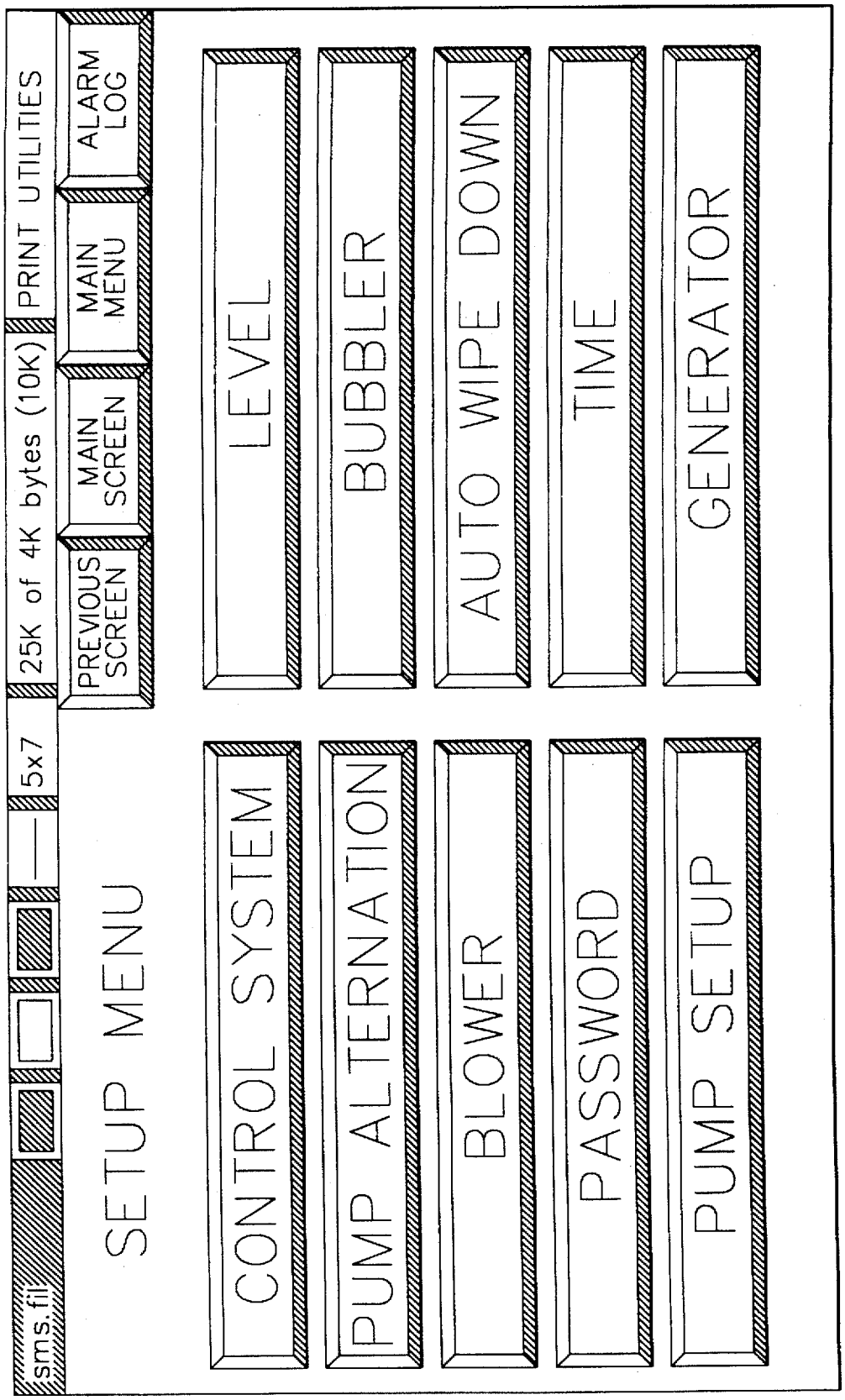
FIG. 14 illustrates the setup menu screen.
Figure 15A:
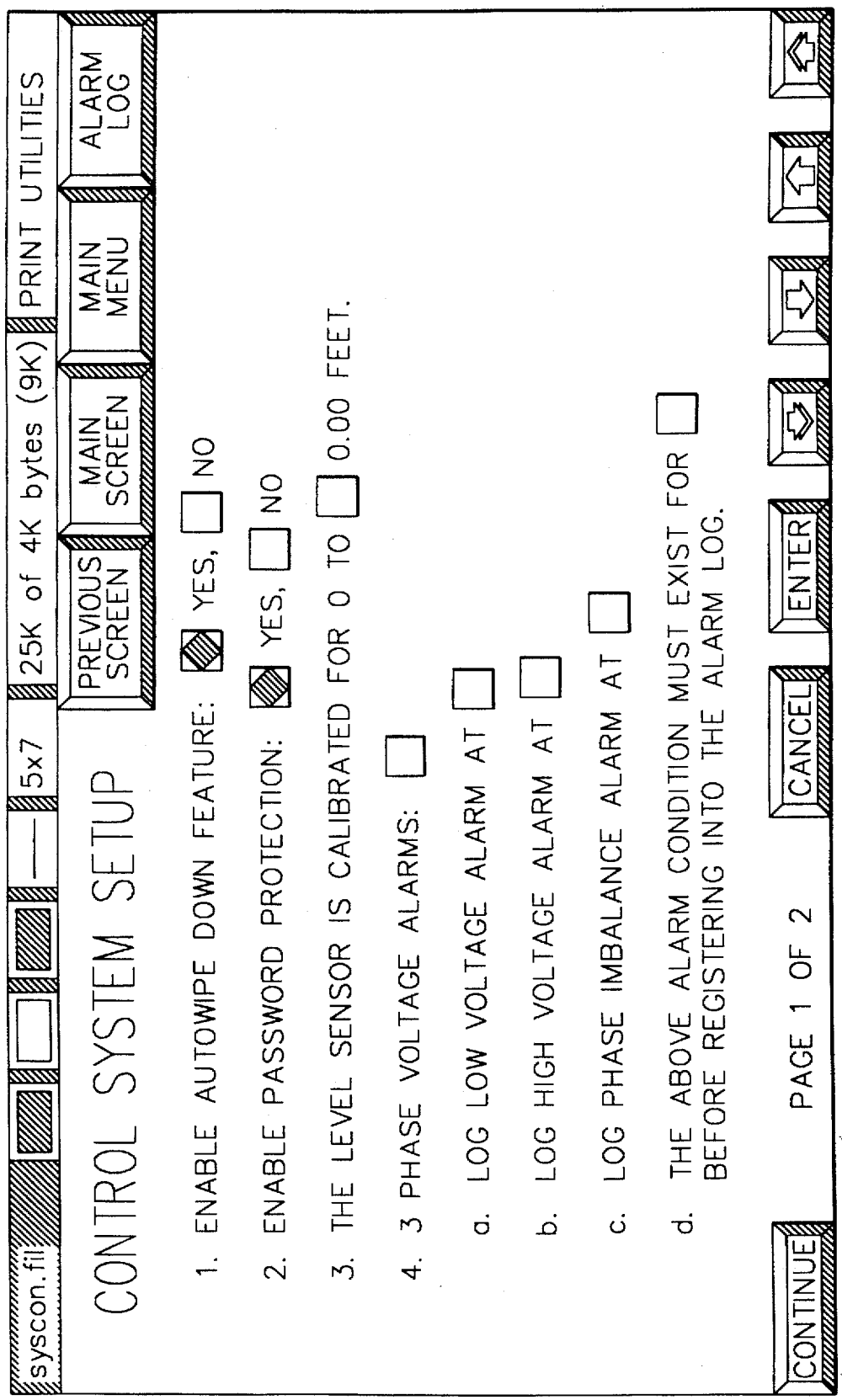
Figure 16B:
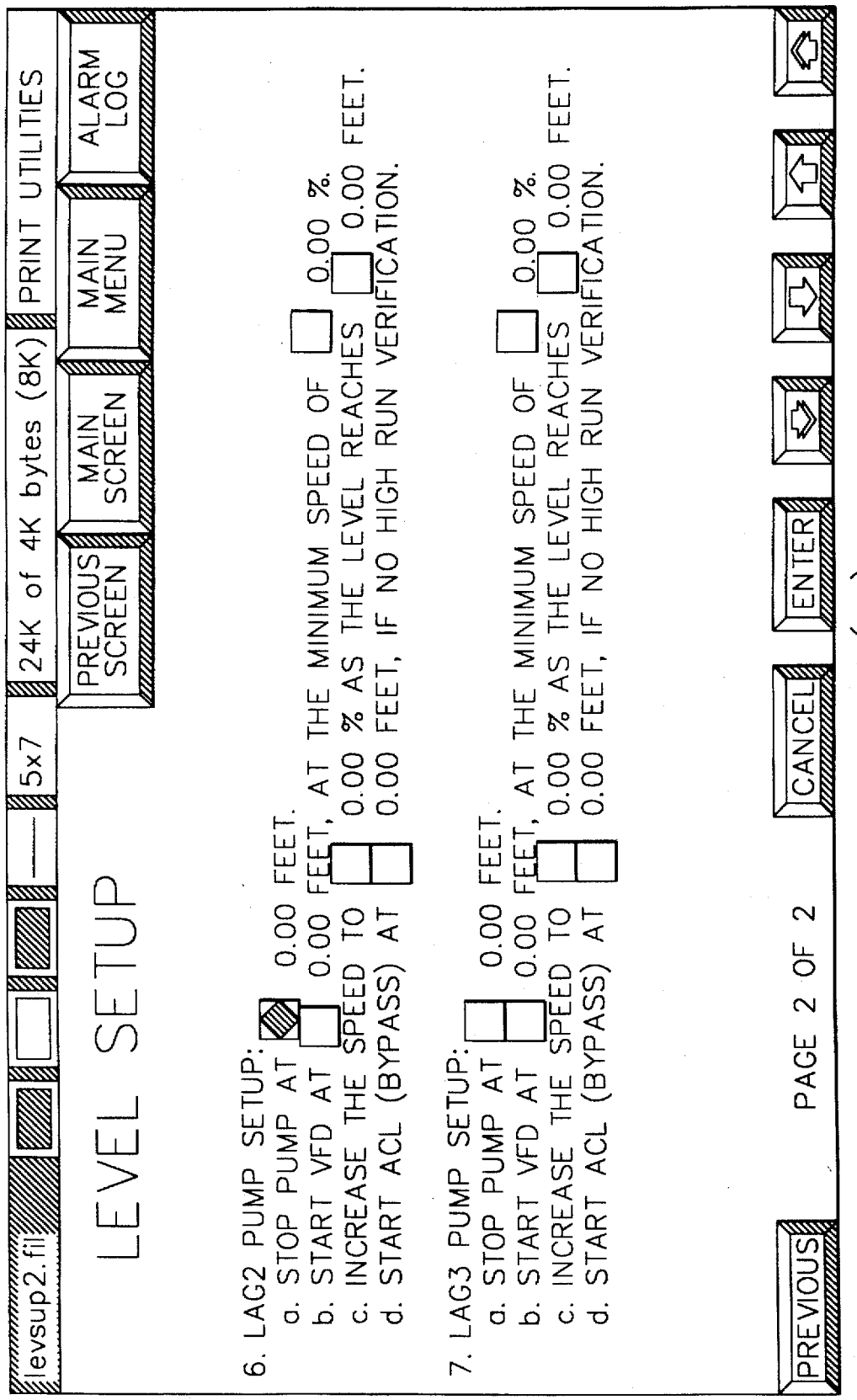
Figure 17B:
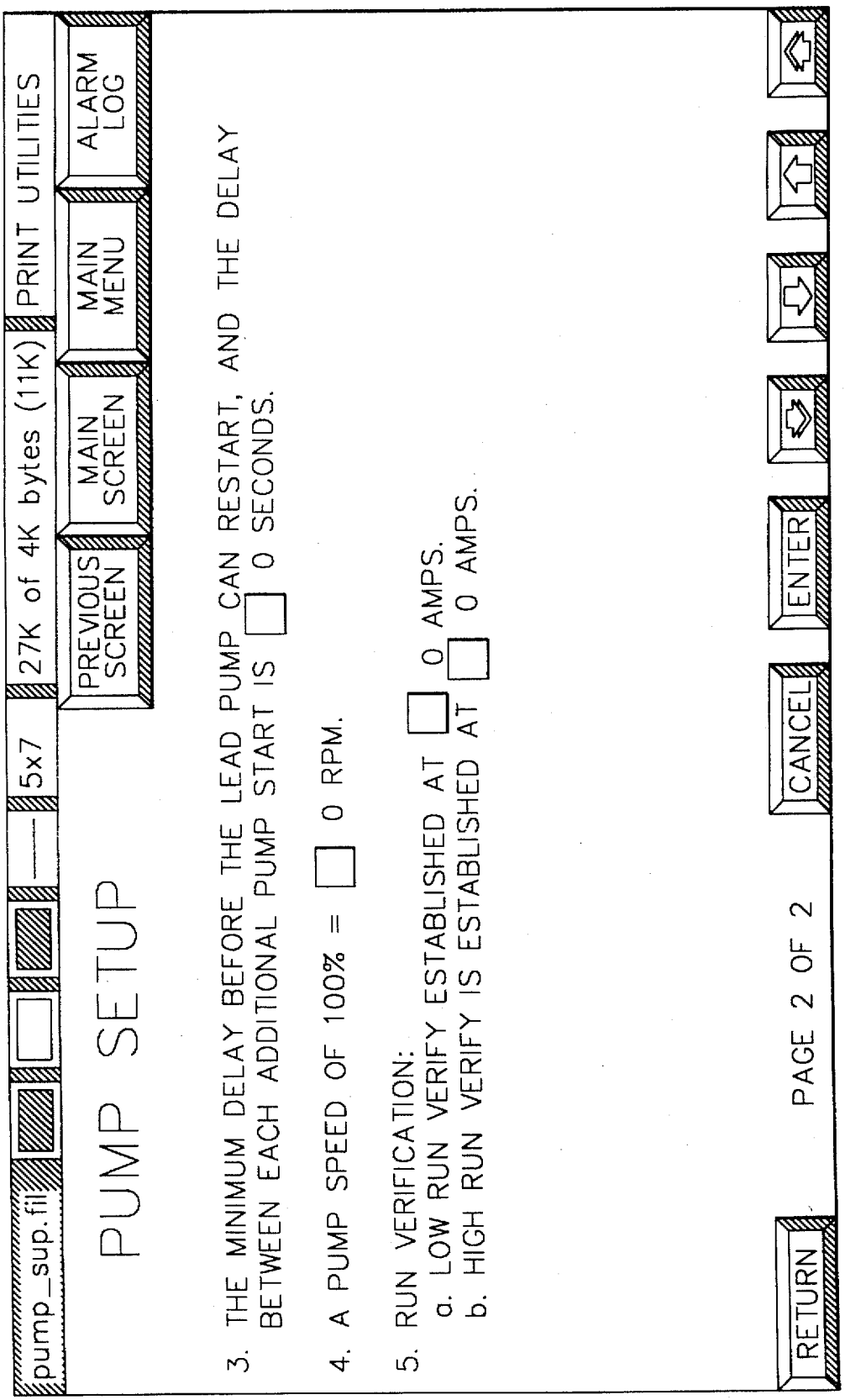
Figure 17C:
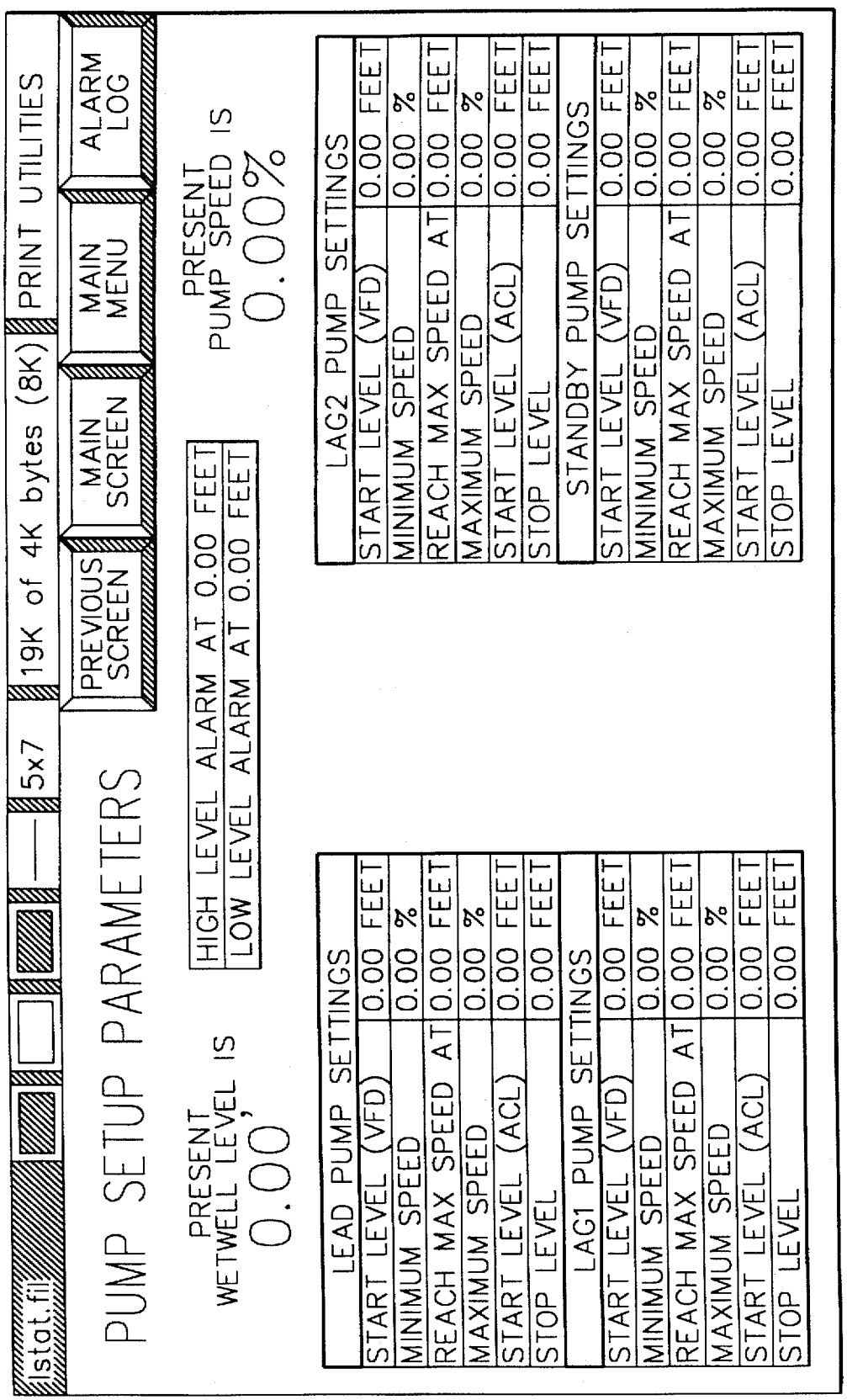
Figure 20:
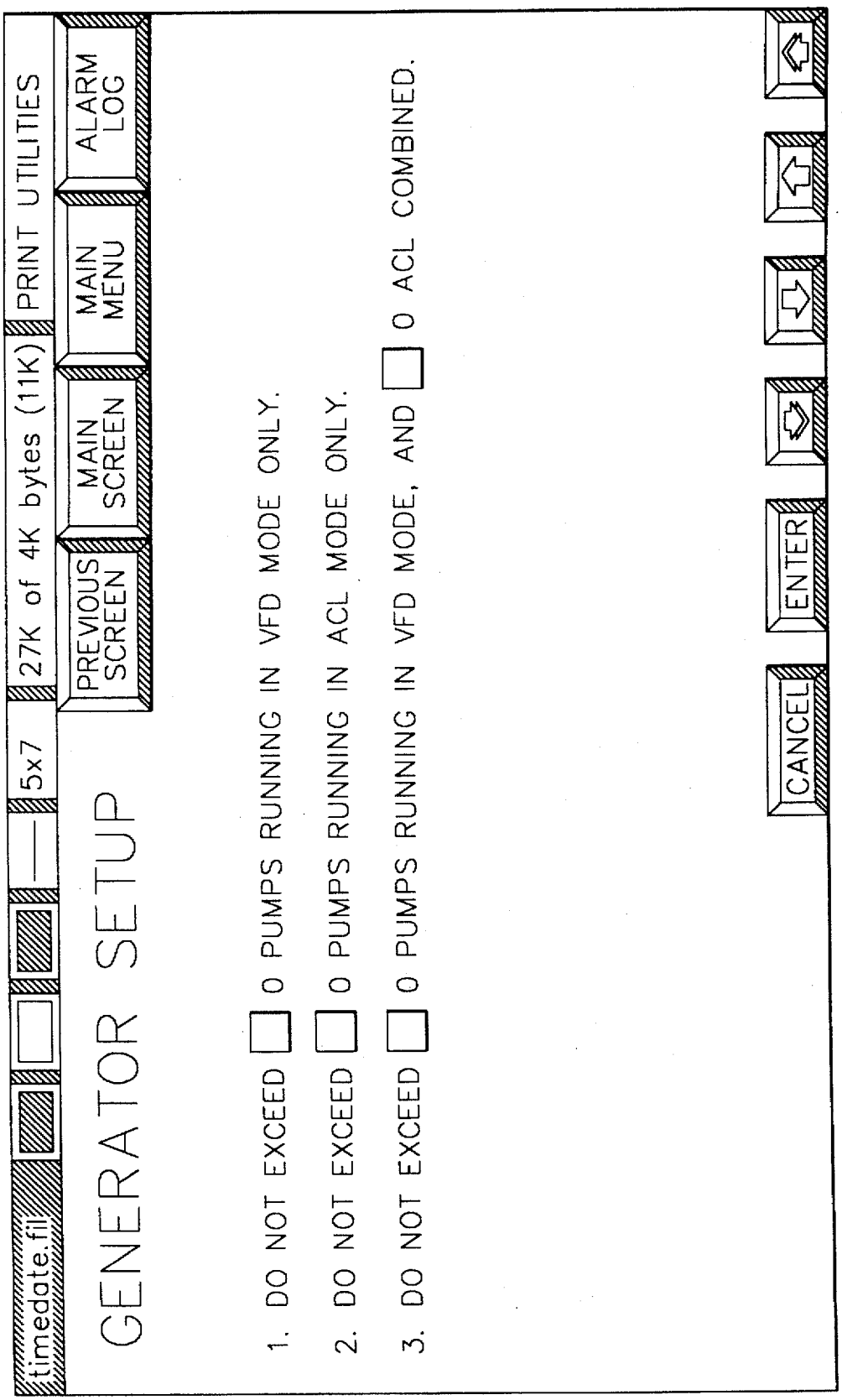
FIG. 20 illustrates the generator setup screen.
Figure 21:
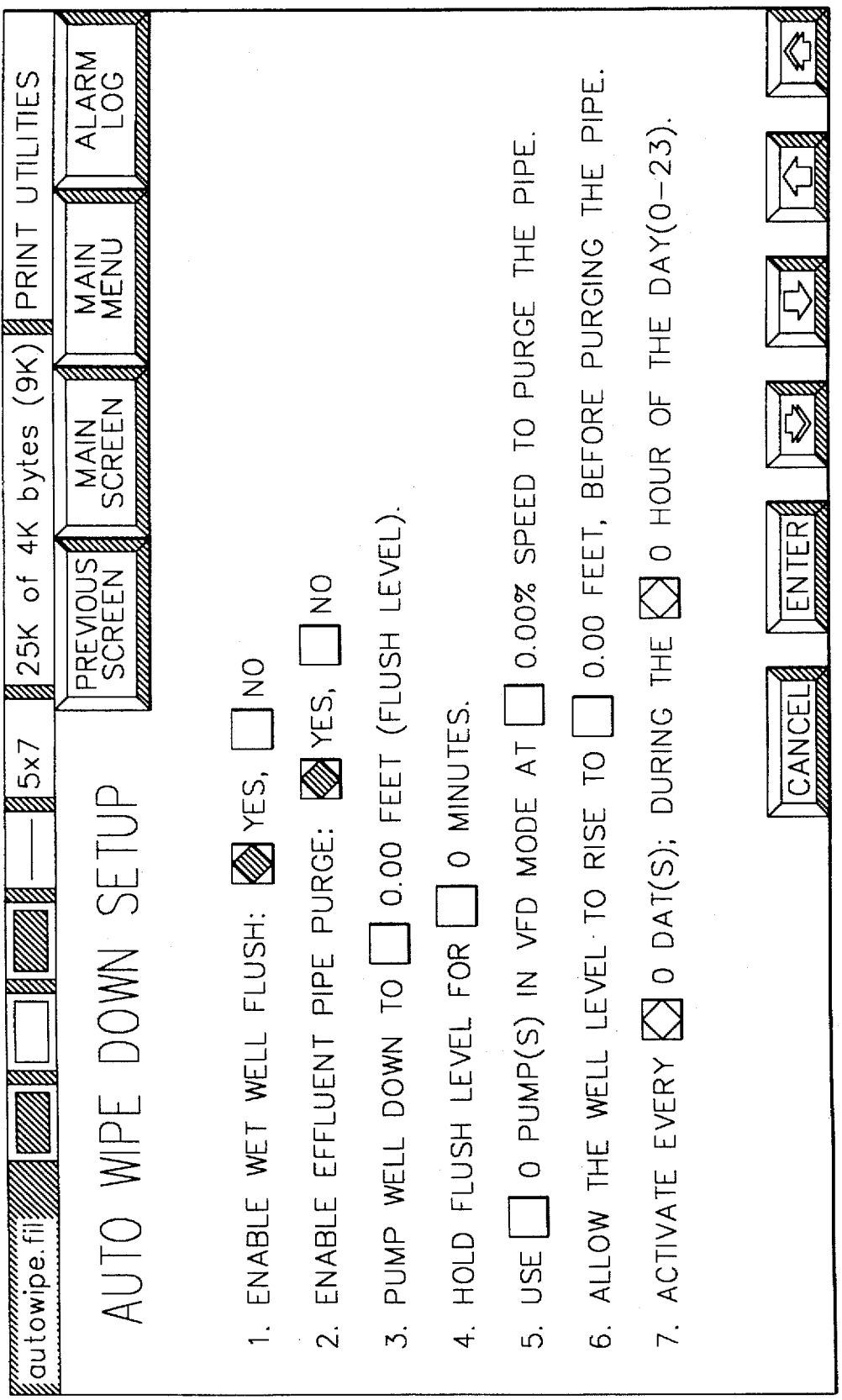
FIG. 21 illustrates the auto wipe-down setup screen.
Figure 22A:
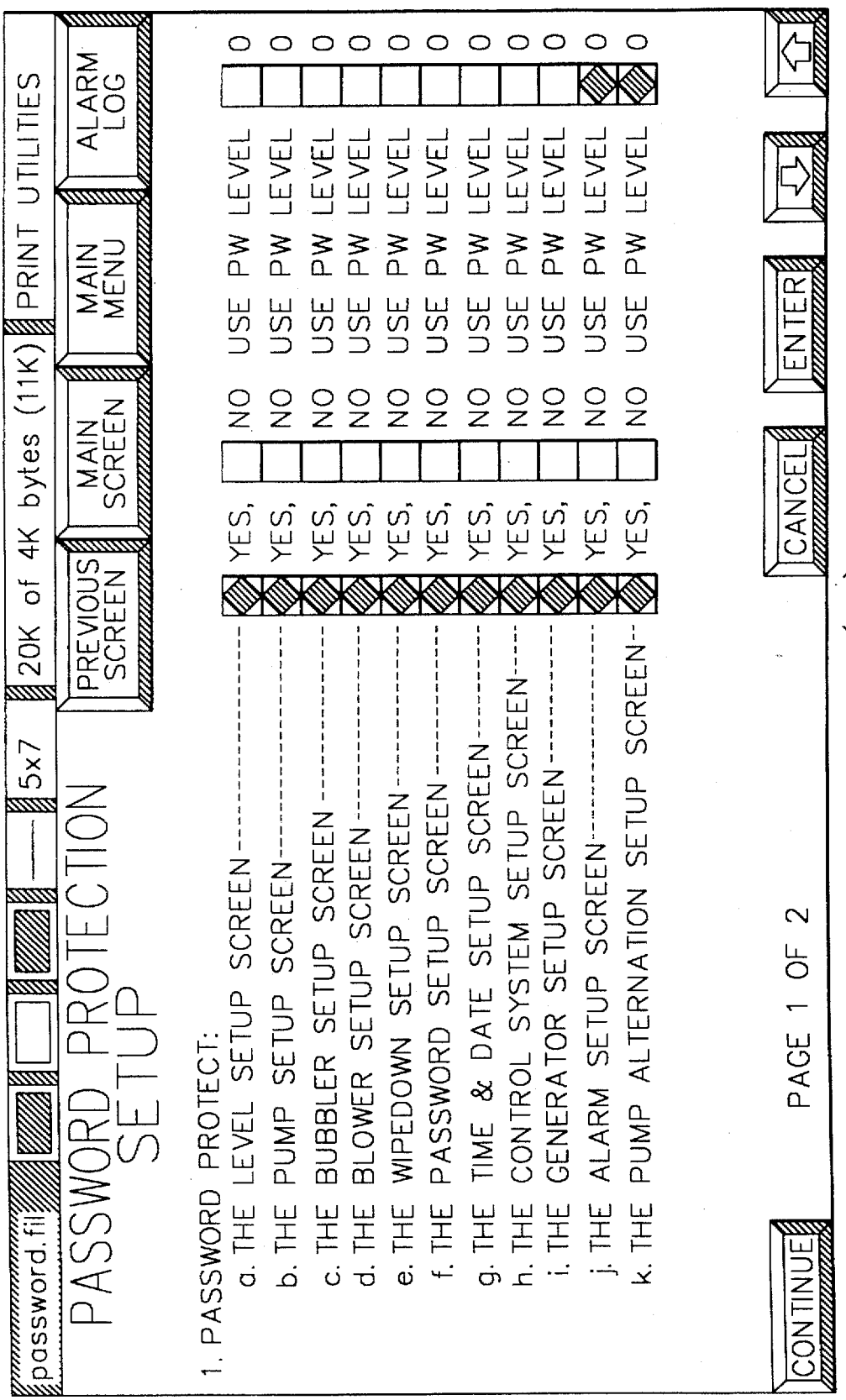
Figure 23:
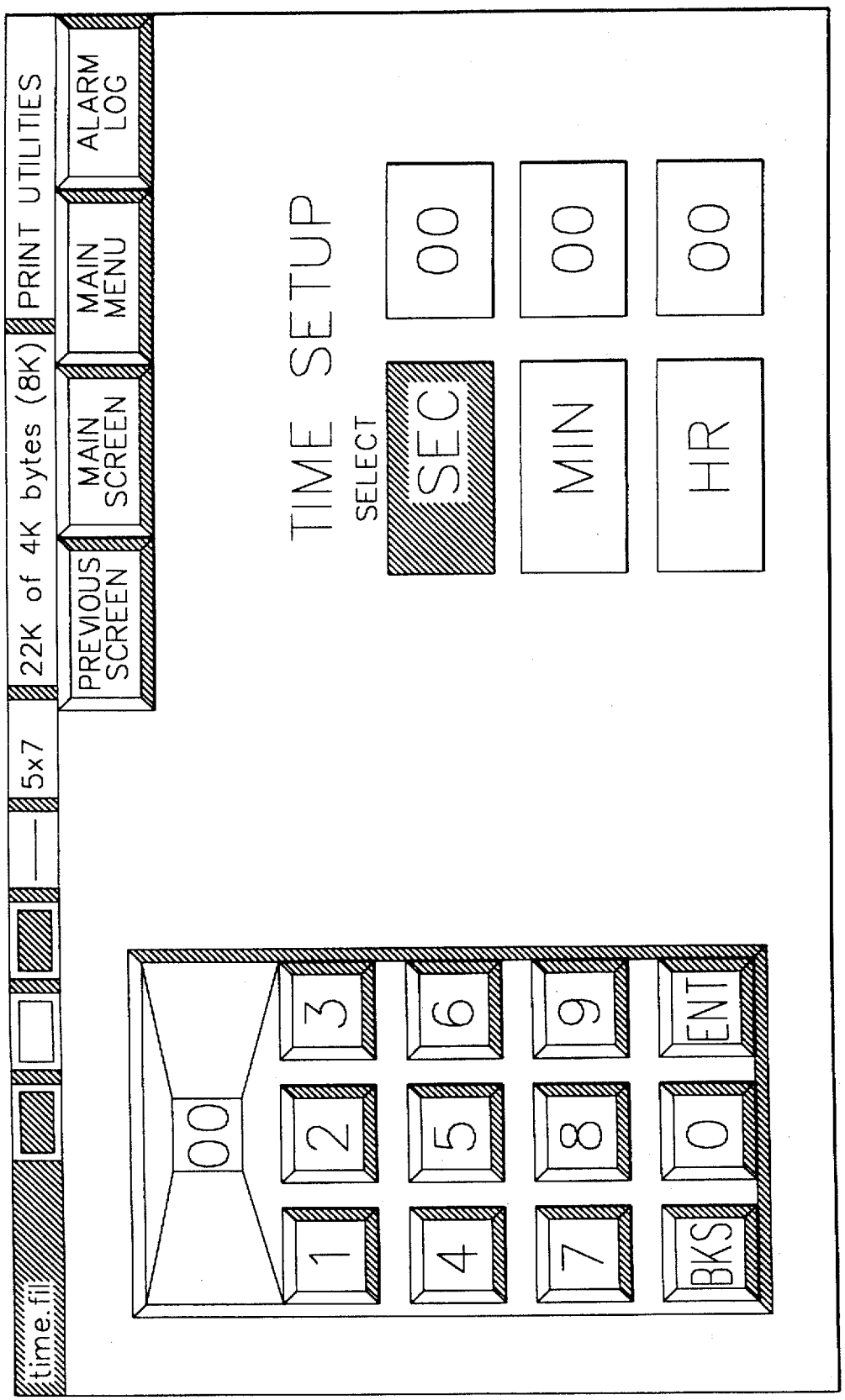
FIG. 23 illustrates the time and date setup screen.
Figure 24:
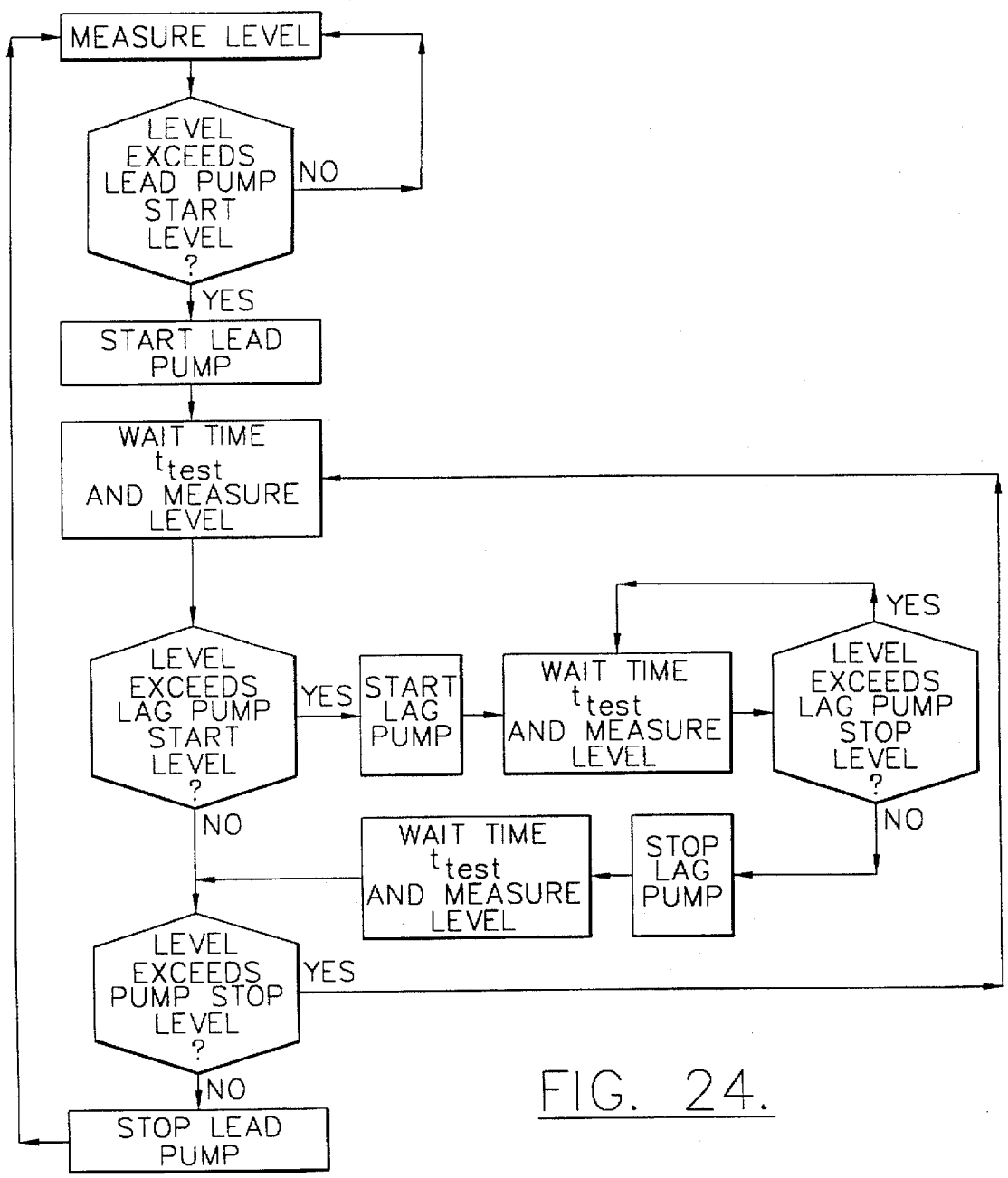
FIG. 24 is a flow chart of the control scheme for a multipump, constant-speed system.
Figure 25:
FIG. 25 illustrates the pump alternation setup screen.

Similarly, in FIG. 11 is illustrated a Blower Status Screen. In this embodiment, there are shown icons for two blowers 23,24. The blowers cool the VFDs and control panel, and also maintain air quality in the central enclosure by excluding corrosive sewage gases. In the center portion of this screen are shown cubic feet per minute being blown and the control functions for each blower. Blower status information is provided on the left, and alarms are listed on the bottom right and left of the screen. On the upper right are given the enclosure pressure and temperature.

The Level Status Screen (FIG. 12) displays the settings for the four pumps, the present wet-well level, and the present pump speed as a percent of maximum.

The System Power Information Screen (FIG. 13), also referred to on FIG. 5 as "Voltage Status," provides the voltages across the three lines of incoming three-phase power L1, L2, and L3. The phase imbalance represents the difference between the actual phase lag and the desired 120 degree phase lag between the lines.

Returning to FIGS. 7–9, a key feature of the system is illustrated. The Energy Information Menu (FIG. 7) provides the operator a choice of viewing energy usage information on a real-time or historical basis.

Figure 8:
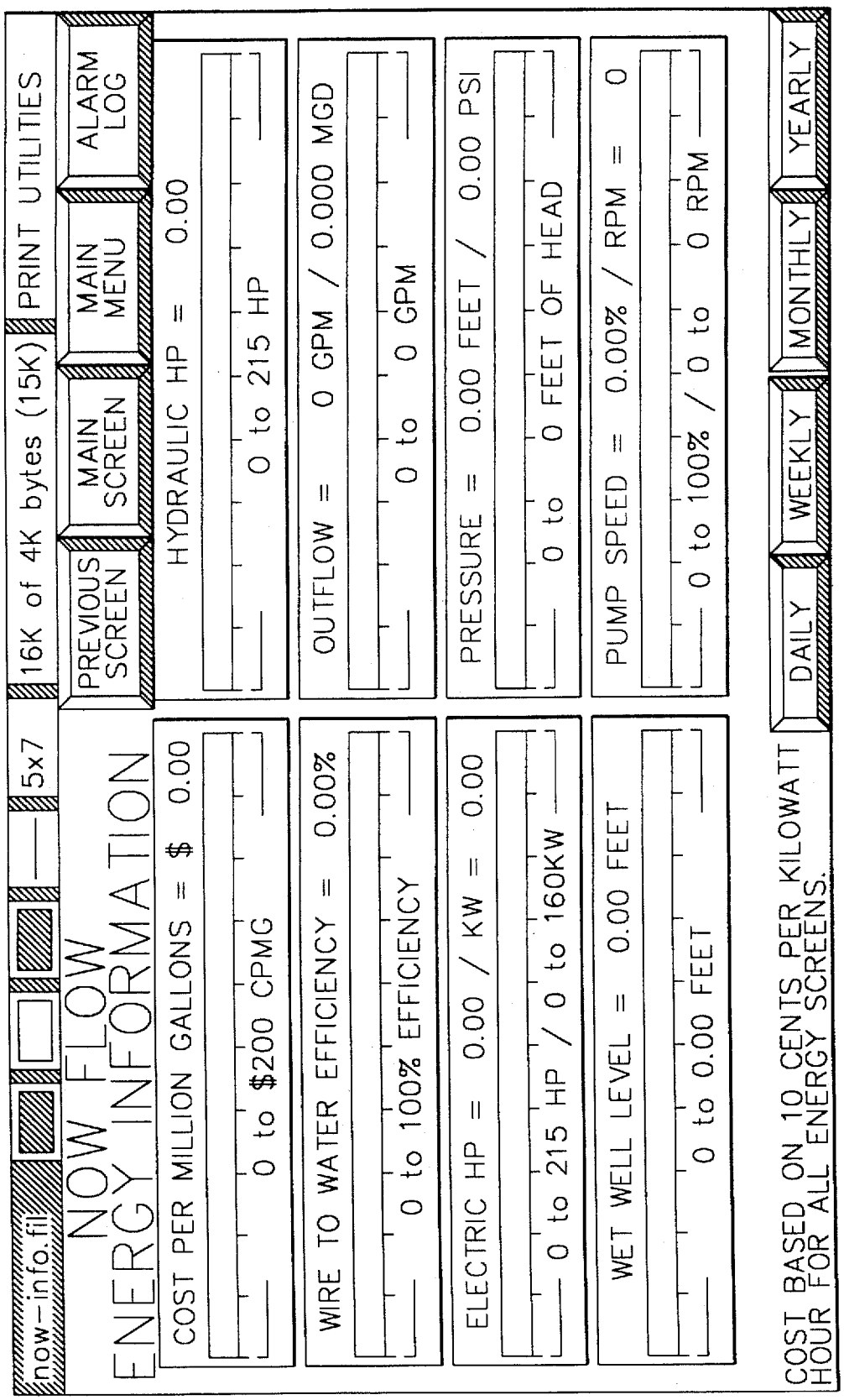
FIG. 8 illustrates a real-time flow and energy information screen.
Figure 9D:
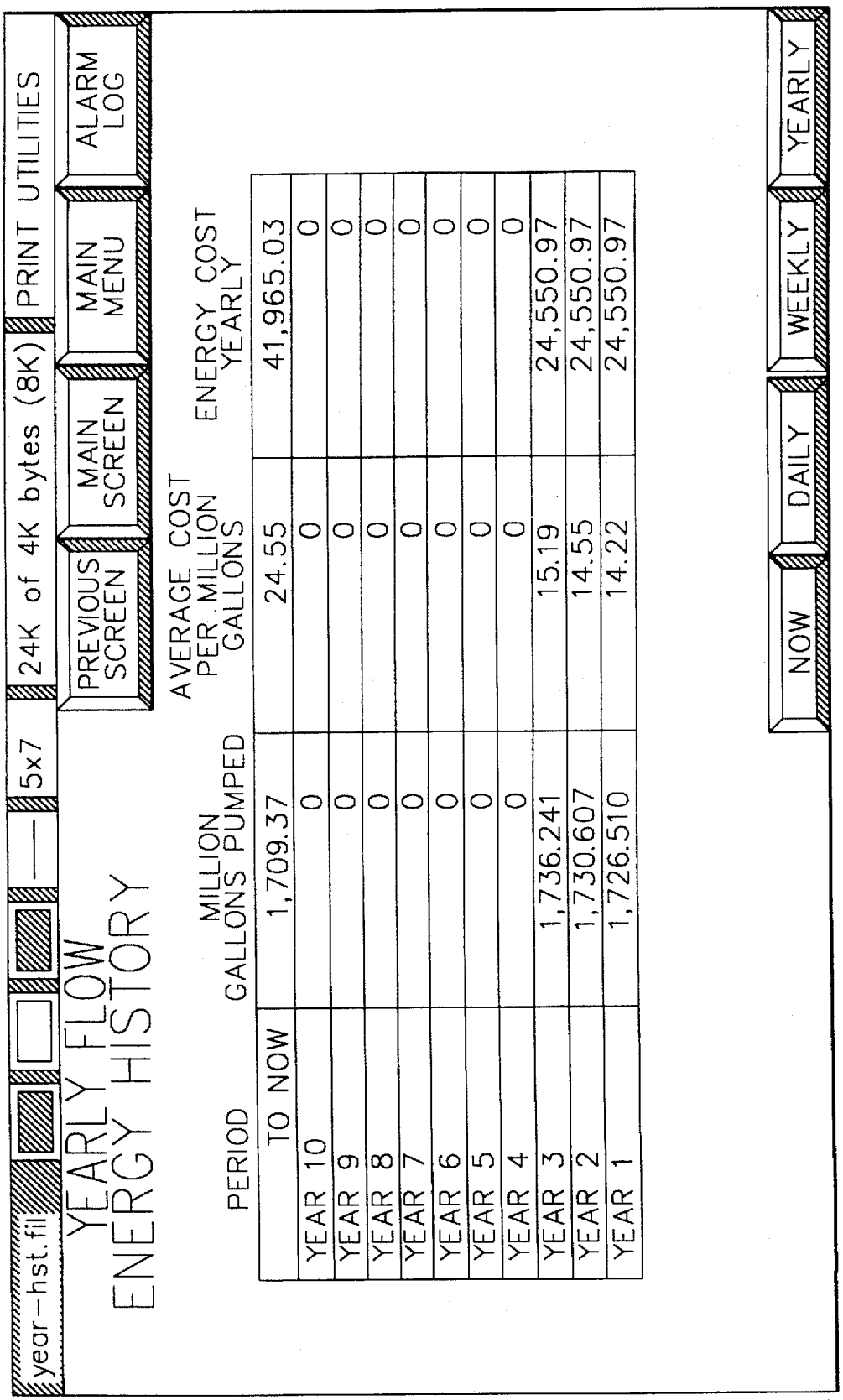

FIG. 8, which illustrates the Real-Time Flow and Energy Information Screen, provides system data and also calculations made by the computer 18 from sensed system data for calculating a real-time cost parameter of the system. In the case shown, this cost parameter comprises energy usage per volume of liquid pumped, or, as mentioned previously, a Cost per Million Gallons™ (CPMG) figure.

Additional data also given on this screen include the "wire-to-water efficiency," horsepower (electric and hydraulic), wet-well level, outflow, pressure (feet of head), and pump speed.

Historical flow and energy information is provided in the screens shown in FIG. 9a–d for, respectively, daily, weekly, monthly, and yearly periods. The columns in each of these screens list time period, millions of gallons pumped in that time period, time-based energy cost, and average CPMG.

An additional feature of the screens of FIG. 9a–d is given in the final column, which displays calculations from the computer for predicting a future cost parameter over a predetermined period of time, the future cost parameter being the predicted energy cost, shown as a dollar amount. The future cost is calculated as a function of predicted cost per volume liquid pumped and predicted wet-well inflow. In the simplest case, the most recently recorded values of each quantity are extrapolated into the future. Higher accuracy may be obtained using more complex methods. For example, a knowledge of previous cyclic flow variations can be used to predict future inflows. Pump degradation can also be extrapolated into the future.

The Cost per Million Gallons™ Factor

It can be appreciated that the CPMG figure represents an inverse of a throughput efficiency figure, which equals the quantity of material pumped divided by the energy consumed.

CPMG was developed to show the direct relationship between gallons pumped and dollars spent on energy used to transfer one million gallons of liquid pumped from the lift station well 17 to the discharge from the lift station force mains.

The CPMG reading can be compared to the "wire-to-water efficiency" rating, which has been considered the industry standard for defining the optimal operating state for a pump station. The wire-to-water efficiency factor is calculated as the hydraulic horsepower output of the pump divided by the electric horsepower input to the pump motor. Since it is understood that electric HP drops with a reduction in pump speed, it has always been assumed that energy costs would drop as well. The wire-to-water efficiency was then judged to be the best measurement to use in determining energy-efficient and effective pump speed.

The CPMG factor has surpassed wire-to-water efficiency ratings and has proved to be a much more reliable and accurate predictor of energy usage and costs. As an added benefit, CPMG is not limited to any type of pumping station. It can also be applied to any type of pumping station and can be readily understood by all involved personnel. It should also be noted that "cost" can include, in addition to energy costs, maintenance costs or other usage costs that depend on the operating parameters of the system. For example, a wastewater pumping system can incur overflow charges based on the duration of an overflow.

It is also possible that the cost-per-throughput value can be more complex. For example, it is common in wastewater lift stations to have energy costs that depend on time of day and on power consumption rates ("peak surcharges"). In such cases this value offers advantages over previously used systems.

Testing has consistently shown that the CPMG is the only known reliable method of determining the lowest-cost pumping speed. In multiple pump stations, CPMG can also be used to find the best pump operating and alternation patterns.

The CPMG factor can also be applied as a predictive maintenance tool to alert the operator to a need for repair or replacement of equipment. Specifically, by correlating the real-time operating parameters of the equipment with a time history of its operating parameters stored in the storage means, or with predetermined desired operating parameters, one can predict the failure of that pump station element. For example, a significant increase in the CPMG may show that a pump is not operating as expected. A closer examination may show pump degradation in one or more pumps. The operator can then test the pumps, evaluate the CPMG ratings, and determine if it is more cost effective to replace or repair the pump or continue to run the pumps until degradation worsens. CPMG is the best known quantitative method usable for making this type of decision.

Calculation of Throughput Efficiency and Cost per Throughput

Calculating the throughput efficiency includes calculating cumulative material flow and energy consumption over some predetermined time period, and then calculating a single efficiency parameter using both of these quantities:

$$\text{Throughput efficiency} = \int_{t_0}^{t_0 + \Delta t} Q(t)dt / \int_{t_0}^{t_0 + \Delta t} P(t)dt$$

where $Q(t)$ denotes a material flow parameter such as volume or mass flow rate measured by one or more transducers at time $t$, $P(t)$ denotes power consumed by the motors of one or more pumps at time $t$, and the parameter is calculated for a time interval $\Delta t$ beginning at time $t_0$. Power consumption can in turn depend on a number of operating parameters, including pump speed, pump selection, wet-well level, flow, state of check valves, and condition of pipelines and other components. Typically, $Q(t)$ and $P(t)$ are measured directly; however, it can also be useful to calculate at least one of $Q(t)$ and $P(t)$ as a predetermined function of various real-time operating parameters, for purposes of controlling these parameters to optimize operating efficiency.

Similarly, calculating cost per throughput always includes calculating cumulative material flow and costs over some predetermined time period, and then calculating a single efficiency parameter using both of these quantities. A preferred form of cost per throughput is $$\text{Cost per throughput} = \int_{t_0}^{t_0 + \Delta t} C(t)dt / \int_{t_0}^{t_0 + \Delta t} Q(t)dt$$

where $C(t)$ denotes the cost rate at time $t$. In general, $C(t)$ cannot be measured directly, but must be calculated from measured or predetermined operating parameters. Typically energy costs are a major contributor; so a preferred form of $C(t)$ is $$C(t) = P(t)r(t) + c(t)$$

where $r(t)$ is the real-time cost per unit energy and $c(t)$ denotes the rate of costs other than energy costs (such as overflow penalties). As above, the various components of $C(t)$ can be expressed as predetermined functions of various operating parameters for the purpose of optimizing or comparing system operating efficiency.

In practice, the integrals are usually approximated as sums calculated by a microprocessor using standard numerical methods, or measured by electronic integration of an analog signal (for example, integrating current on a capacitor). The choice of specific transducer outputs and integration times used in the calculation depends on the specific calculation, as will be seen.

Systems with Cyclic Flow

An additional principle applies to systems characterized by cyclic inflows or outflows. In these systems operating efficiency is preferably calculated for a time interval $\Delta t$ comprising an integral number of cycles. For example, a wastewater lift station usually has a cyclic level versus time profile (and cyclic outflow by inference), as shown in FIG. 27b. The operating efficiency can depend on the wet-well level because a high level at the inlet increases the inlet pressure. Therefore, the operating efficiency can vary in a cyclic fashion, and invalid conclusions can result if two pumps, stations, or time periods are compared based on different portions of a cycle.

Figure 27A:
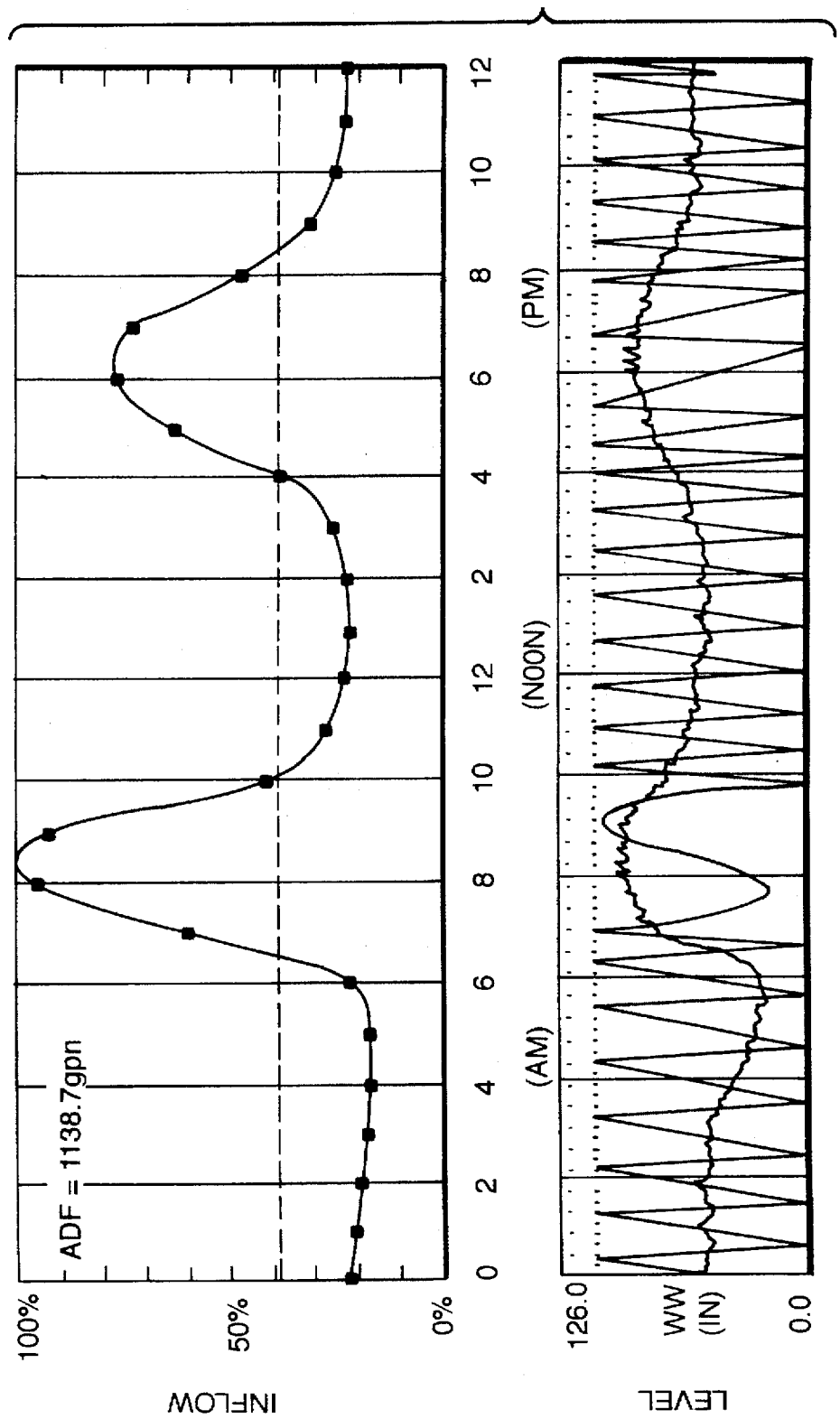
FIG. 27(a) graphically represents a typical inflow profile and the resultant wet-water level under the operation of a pumping system.
Figure 27B:
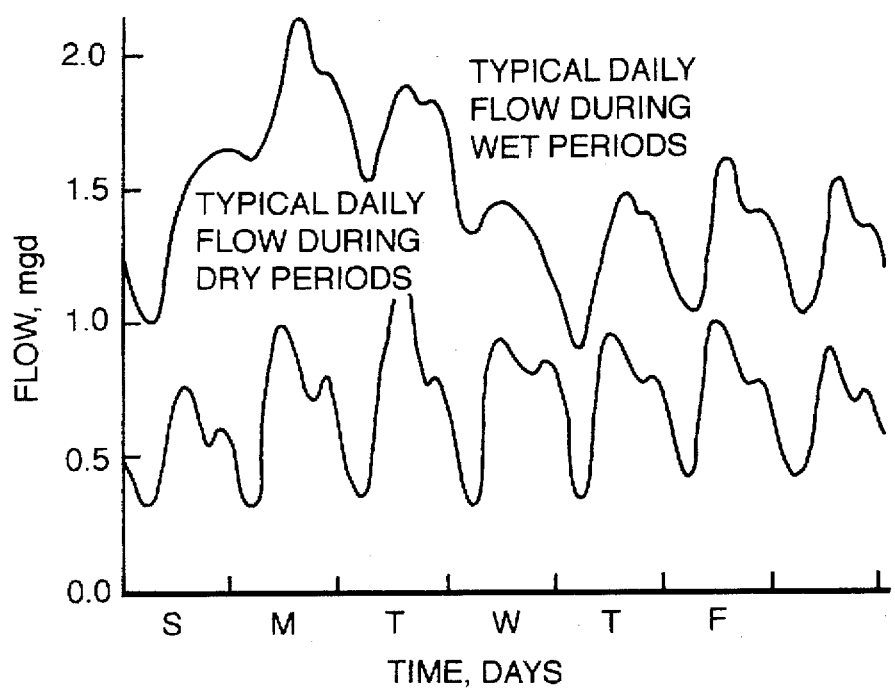
FIG. 27(b) a graphically represents typical daily and weekly variations in sewage flow.

In another example, wastewater inflows are known to have predictable daily, weekly, and seasonal cyclic variations (see FIG. 27a for an exemplary inflow profile taken over one day). For the most accurate comparisons, long-term operating efficiency is preferably calculated over an integral number of these cycles.

In some cases it is necessary to calculate operating efficiency over a portion of a cycle. In these cases operating efficiency is preferably calculated over a time period having a predetermined relationship to a flow cycle, and comparisons are preferably based on similar portions of a given cycle.

Throughput Efficiency of a Single Pump

In a system having a single pump, a first transducer continuously provides an analog signal that is proportional to the flow Q at the pump outlet. Alternatively, flow can be calculated from wet-well rate of rise and a predetermined relationship between wet-well level and quantity. A second transducer continuously provides an analog signal proportional to the electrical power P consumed by a motor coupled to the pump. Alternatively, P can be calculated from measurements of voltage, current, and power factor. In either case, a microprocessor repeatedly samples both Q and P at points in time $t_j$ separated by a constant interval $\delta t$. The throughput efficiency is then $$\text{Throughput efficiency} = \sum_i^N Q_i / \sum_i^N P_i$$

For cyclic flows, $N\delta t$ is preferably an integral number of cycles. The calculation can be more accurate with more complex numerical integration schemes, such as a trapezoidal method.

Throughput Efficiency of Multiple Pumps in Parallel

Transducers measure the flows Q1 and Q2 at the outlets of pumps #1 and #2, and the powers P1 and P2 consumed by the respective pump motors. The calculation is the same as above, except Q=Q1+Q2 and P=P1+P2. Alternatively, Q can be measured by a transducer at the outlet header of the combined pump system. In a system without a flow transducer, Q can be calculated from the rate of change of the water level in the wet well.

Cost per Throughput

Transducers measure the flow and power as in the previous examples. Information on cost per unit energy as a function of time, r(t), is stored in the data storage means. If $r(t)=r_0$ is a constant, then cost per throughput can be calculated directly or from throughput efficiency.

$$\text{Cost per throughput} = r_0 \sum_i^N Q_i / \sum_i^N P_i$$
$$= r_0 / \text{throughput efficiency}$$

In many areas r(t) varies with time of day, day of the week, or time of year. In this case a table of values of r versus t can be stored in system memory or on disk, and these values can be used:

$$\text{Cost per throughput} = \sum_i^N [r(t_i) \cdot P_i] / \sum_i^N Q_i$$

In some areas r(t) also depends on the station's real-time power demand, or rate increases ("demand charges") may be applied based on the history of power demand.

The Control System for a Pump Station

In another aspect of the system 15 of the present invention, a control system is provided, again for interfacing between an operator and a pump station having a pump for pumping a fluid. As with the monitoring system, means are provided for sensing a plurality of operating parameters of the pump station and also for transmitting the operating parameters to the operator in real time. An additional feature is provided in the form of means for the operator to communicate a control signal to the pump station to effect a change in an operating parameter.

The screens involved in the control aspect of the present invention are shown in FIGS. 14–25. The Setup Menu Screen (FIG. 14) is accessed from the Alarm/Menu Screen (FIG. 5) and in turn provides access to the control screens.

The Control System Setup Screen (FIG. 15a,b) permits the operator to set alarm limits, enable the auto wipe-down feature, enable password protection, provide calibrations for the level and the flow sensors, and enable the printer option.

The Level Setup Screen (FIG. 16a,b) permits the operator to set high and low level alarms, stop pumps, and configure the four pumps 11–14 with regard to starting and stopping, speed, etc. Further configurational control is established using the Pump Setup Screen (FIG. 17a–c), with which the operator is permitted to specify pump operation modes, standby pump configuration, lead pump delay, pump speed, run verification, and pump setup parameters.

The Bubbler Setup Screen (FIG. 18) permits the specification of air compressor alternation parameters and blow-down options. The Blower Setup Screen similarly permits the specification of blower alternation patterns and alarm limits, as well as a directive to run the blower at high speed if the temperature rises above a predetermined value. The Generator Screen (FIG. 20) allows the limiting of pumps operating in a specified mode.

The Auto Wipe Down Setup Screen (FIG. 21) enables the operator to direct wet well flushing and effluent pipe purging and the parameters therefor. The Password Protection Setup Screen (FIG. 22a,b) permits the protection of all setup screens, thereby to prevent unauthorized persons from altering system parameters and potentially causing harm to the system. The Time Setup Screen (FIG. 23) sets the system time clock.

The Pump Alternation Setup Screen (FIG. 25) permits the operator to direct the scheme of the alternation between pumps.

Returning to FIG. 6, the Pump Status Screen, there is shown the means to reconfigure the pump operation, which is utilized to satisfy the parameters calculated from optimization calculations, which will be discussed in the next section and are exemplified in FIG. 26a and b.

As discussed above in the section on the monitoring aspect of the system, the cost parameter (i.e., CPMG) can be calculated from the real-time system data and displayed to the operator. In addition, there are provided means for calculating a potential optimized CPMG from the sensed parameters and the real-time CPMG. From these data, the computer can determine and display to the operator a recommended change in an operating parameter needed to achieve the optimized CPMG.

An example of how these potential optimization and resultant cost savings can be performed is illustrated in FIG. 26a, showing an exemplary wet well operated under constant speed or variable speed pumping. A summary of the formulas used for this calculation is given in FIG. 26b. These calculations provide the operator with a set of altered operating parameters for achieving optimization.

Variable-Speed Systems

For a given configuration of one or more pumps, there generally exists an optimum pumping speed or speeds that produce a minimum cost per output or maximum throughput efficiency. While specific control schemes vary, a common principle is that, for a given pump configuration:

1. The system should run no slower than the optimum speed(s);
2. Speed and outflow should increase above optimum only as needed to maintain the level below a preset maximum; and
3. If an alternative pump speed or combination of speeds can produce a higher or equal flow with lower cost per throughput (or higher throughput efficiency), then that alternative speed(s) should be activated. The specific speed control sequences below each use data on the relationship between cost per output or throughput efficiency, pump speed(s), and outflow(s). These data can be measured by running the pump through a number of cycles at different speeds and calculating throughput efficiency or cost per throughput at each pump speed. This process can be manually or microprocessor controlled. Large parts of this curve are preferably measured at installation, and additional measurements can be made at later times to determine changes due to system degradation or changed external conditions. The curve can also be calculated using a theoretical or semiempirical model of the hydraulic system.

These data can then be used to identify global and local minima (maxima) of cost per throughput (throughput efficiency) versus speed and/or flow. Whatever the source of data on CPMG or throughput efficiency versus pump speed, various known search techniques can be applied to determine or update the optimum speed(s) or outflow(s) corresponding to global and local minimum CPMG or maximum throughput efficiency. The operating parameters for these optimum states are then stored in memory.

Single-pump, variable-speed system. A typical control sequence known in the art is given in FIG. 15$a,b$. The "function of level" can be any function such that speed generally increases with level. Typically the increase is linear:

$$N=N_0+A(\text{level}-\text{pump stop level})$$

where N is the pump speed, $N_0$ is a preset minimum pump speed, and A is a constant chosen to make the pump reach 100% speed before overflow. As the level decreases: the pump speed typically drops to 10% or less before the pump is turned off. The pump start level is placed higher than the pump stop level to avoid rapidly and repeatedly cycling pump power.

The method of the present invention improves efficiency and costs by running the pump as much as possible at a speed corresponding to minimum cost per throughput or maximum throughput efficiency. For example, FIG. 29$a$ shows a typical plot of CPMG versus speed for a single-pump system. The function of level does not permit $N<N_{min}$. For example, the control sequence still follows FIG. 28, but uses a different relationship between speed and level:

$$N=N_{min}, \text{level} \leq \text{pump start level}$$

$$N=N_{min}+A(\text{level}-\text{pump start level}), \text{level}>\text{pump start level}$$

Figure 28:
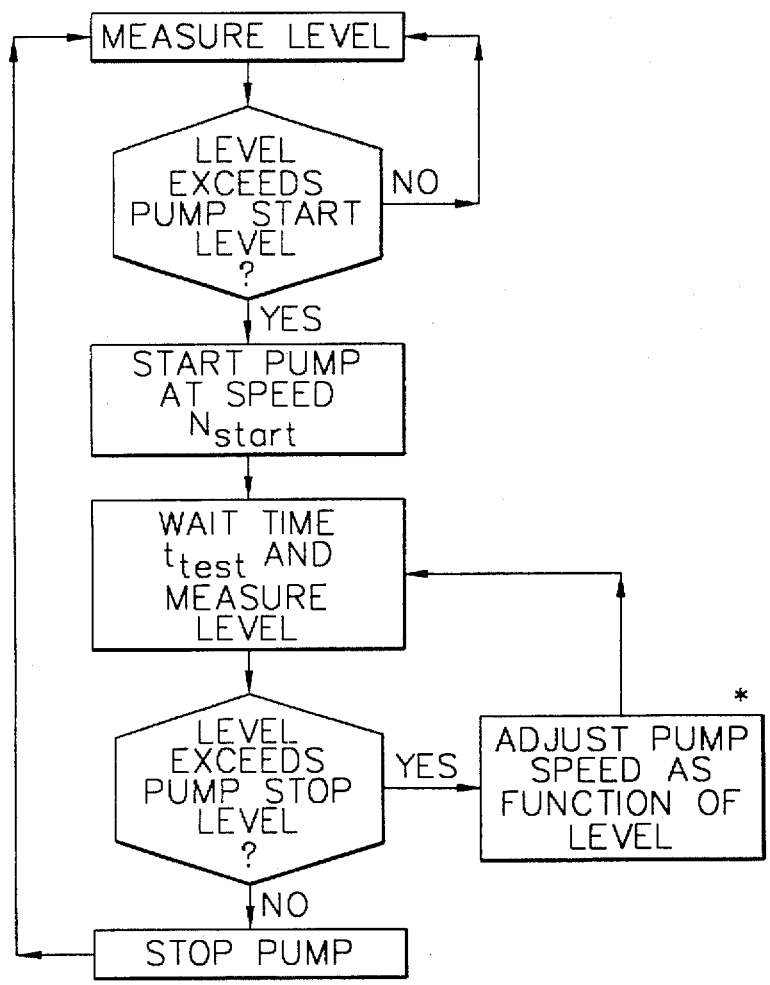
FIG. 28 is a flow chart for a pump operation control sequence.

Note that in practice the level is measured continuously, and the "measure level" steps in FIG. 28 indicate points where the most recent real-time measurement is used in the control sequence.

Figure 29A:
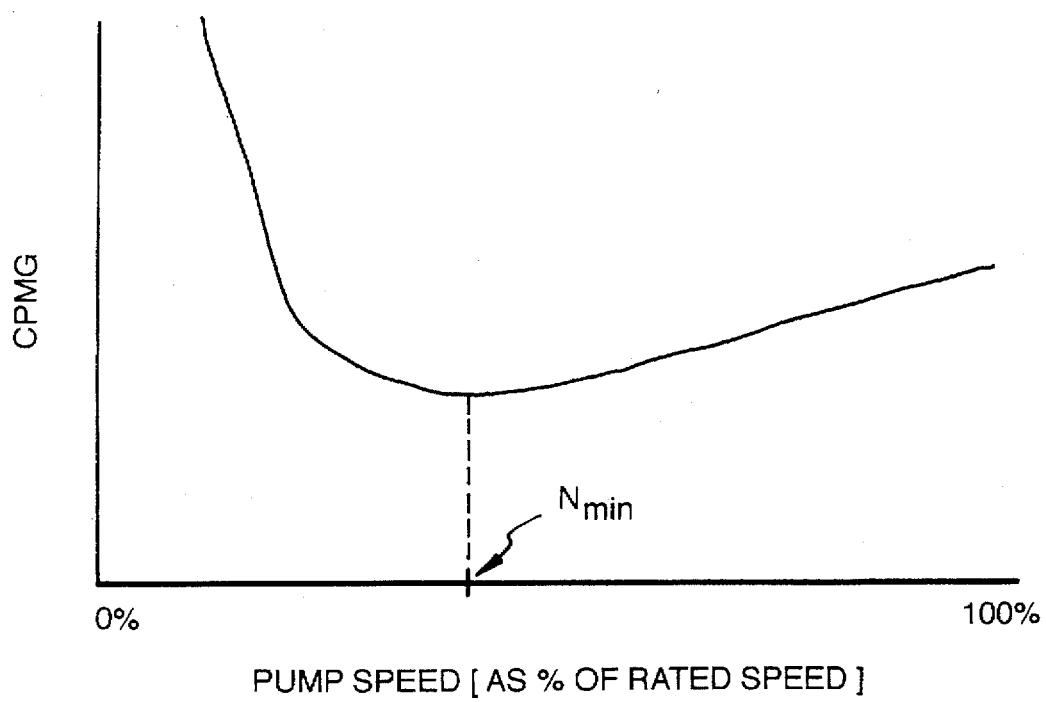
FIG. 29(a)–29(c) plots a cost-per-throughput value versus pump speed for a single-pump variable-speed system: (a) having a single minimum; and having a secondary minimum (b) below and (c) above the global minimum.
Figure 29B:
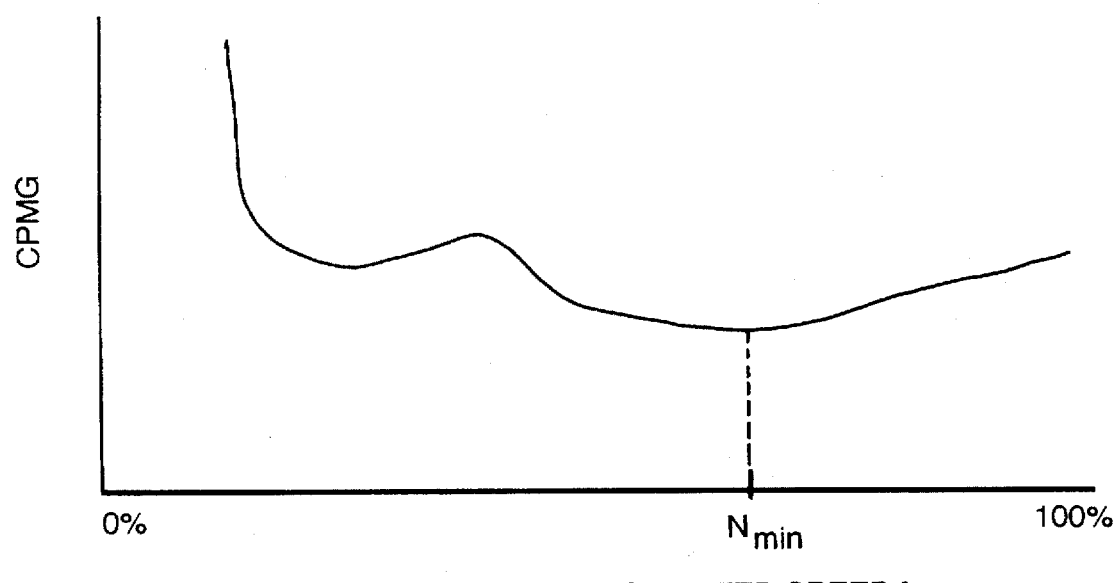
Figure 29C:
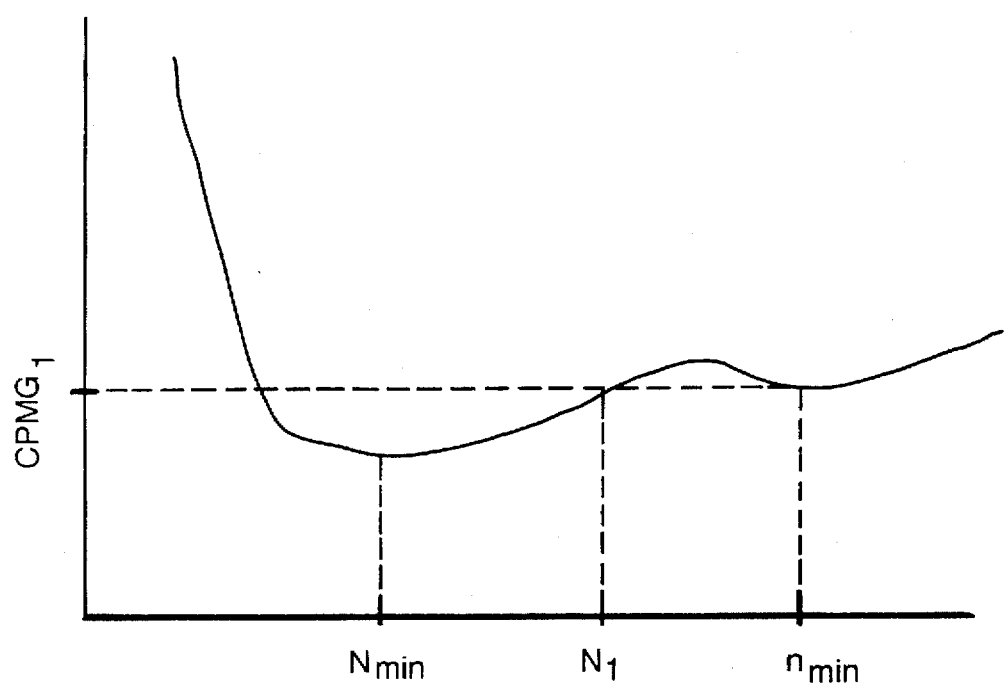

FIG. 29$b$ and $c$ exemplify the case where CPMG versus speed has a secondary, local minimum in addition to a global minimum. In FIG. 29$b$ the secondary minimum occurs at a speed $<N_{min}$, and the control method is unchanged. In FIG. 29$c$ the secondary minimum occurs at $n_{min}>N_{min}$, and the control method should be modified to ensure that the system avoids speeds between $N_1$ and $n_{min}$, and instead lowers CPMG by switching to $n_{min}$. For example, the flow chart in FIG. 28 can still be used, but the "function of level" should become:

$$N=N_{min}, \text{level} \leq \text{pump start level}$$

$$N=N_{min}+A_1(\text{level}-\text{pump start level}), \text{pump start level}<\text{level} \leq L_1$$

$$N=n_{min}+A_2(\text{level}-L_1), \text{level}>L_1$$

where $L_1$ is the level at which $N=N_1$ in the second equation on the right-hand side.

Multipump, variable-speed system. For optimal control in a multipump system, various operating parameters should be measured at a number of combinations of pump speeds. The control method preferably includes identifying combinations of pump speeds that have optimum efficiency—that is, identifying minima (maxima) on the multidimensional surface that describes cost per output (throughput efficiency) versus pump speed. Minima (maxima) including constraints such as a specific total outflow should also be identified. Various techniques known in the art can be used to identify extreme values on such a surface. Most such techniques benefit from using a good initial estimate of the extreme value's coordinates as a starting point for the search. For a given combination of steps, it has been found that the optimum efficiency point can be estimated as the point where each pump runs at the speed that would provide minimum cost per throughput or maximum throughput efficiency if that pump were running alone. In some cases identifying the extrema may require measurements at many different combinations of pump speeds, so that it may be impractical to make each measurement over an entire pumping cycle. In this case the preferred search technique may use some less accurate measurements made over portions of a cycle.

Figure 30A:
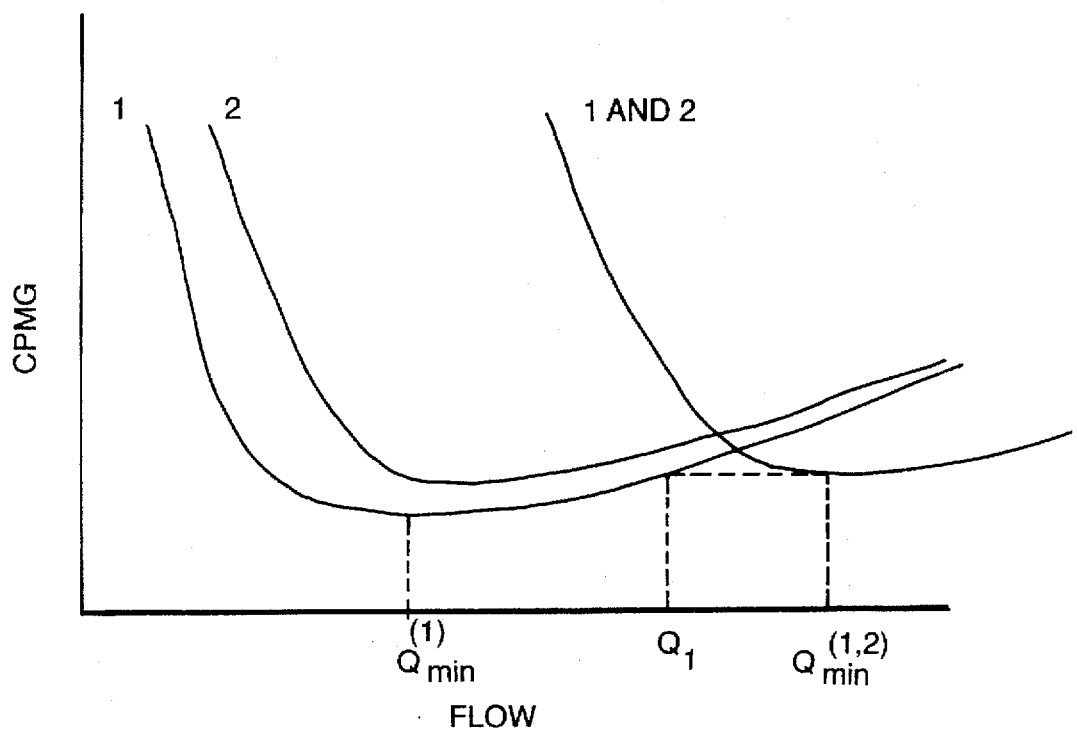
FIG. 30(a)–30(b) plots a cost-per-throughput value versus flow for a multipump system, each having three modes: (1) pump #1 alone; (2) pump #2 alone; and (3) pumps #1 and #2 simultaneously. The lower minimum cost figure belongs to (a) pump #1; (b) pump #2.

FIG. 30$a,b$ illustrates two scenarios for CPMG versus total flow for a two-pump system. Each plot shows CPMG versus total flow in three different modes: (1) pump #1 alone, (2) pump #2 alone, and (3) pumps #1 and #2 simultaneously. The curves for two-pump modes assume that the total flow has been apportioned between the pumps to maximize throughput efficiency or minimize cost per output at a given total flow. The optimum outflow is labeled $Q_{min}^{(1)}$ for pump #1 alone, $Q_{min}^{(2)}$ for pump #2 alone, and $Q_{min}^{(1,2)}$ for pumps #1 and #2 operating simultaneously. Pumps #1 and #2 may be intrinsically different, or they may be originally identical pumps with different curves by virtue of different degradation or installation. For example, one pump in a two-pump system is typically installed farther from the main discharge, and therefore has a higher CPMG because of higher dynamic head. FIG. 31 shows the control scheme for this example.

FIG. 30$a$ shows the case where the minimum CPMG of pump #1 is lower than that of pump #2, and that of the two-pump is intermediate between the two. Following the general principles outlined previously, there is no reason to operate pump #2 alone: pump #1 becomes the lead pump, and pump #2 (lag pump) is activated simultaneously if a higher outflow is required. The "function of level" (box with one asterisk) can be:

$$N^{(1)}=N_{min}^{(1)}, \text{lead} \leq \text{pump start level}$$

$$N^{(1)}=N_{min}^{(1)}+A_3(\text{level}-\text{lead pump start level}), \text{lead pump start level}<\text{level}$$

where $N_{min}^{(1)}$ is the speed at which pump #1 provides minimum CPMG and flow $Q_{min}^{(1)}$. When the requested flow exceeds $Q_1$, the system can lower its total CPMG by switching to two-pump mode. Therefore, the lag pump start level is chosen to correspond to the level at which the step indicated with one asterisk in FIG. 31 would begin to call for an outflow $>Q_1$. Then the "function of level" (box marked with two asterisks in FIG. 31) is determined by finding the combination of pump speeds $N^{(1)}$ and $N^{(2)}$ that provides the lowest CPMG at each total flow Q and maintains $Q \geq Q_{min}^{(1,2)}$. For example, $Q=Q_{min}^{(1,2)}$, level≤lag pump start level $Q=Q_{min}^{(1,2)}+a_4$(level–lag pump start level), level>lag pump start level When the level begins to decrease, the system switches back to one-pump mode. The lag pump stop level is typically slightly lower than the lag pump start level to avoid rapidly cycling to pump off and on again.

Figure 30B:
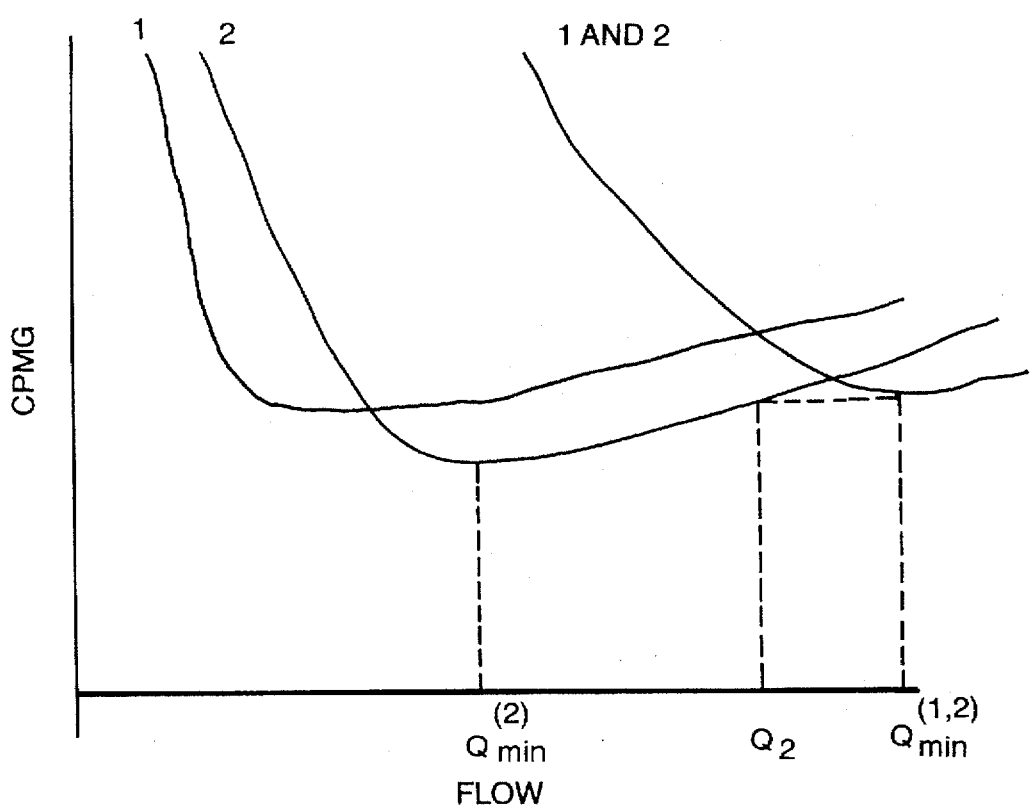
Figure 31:
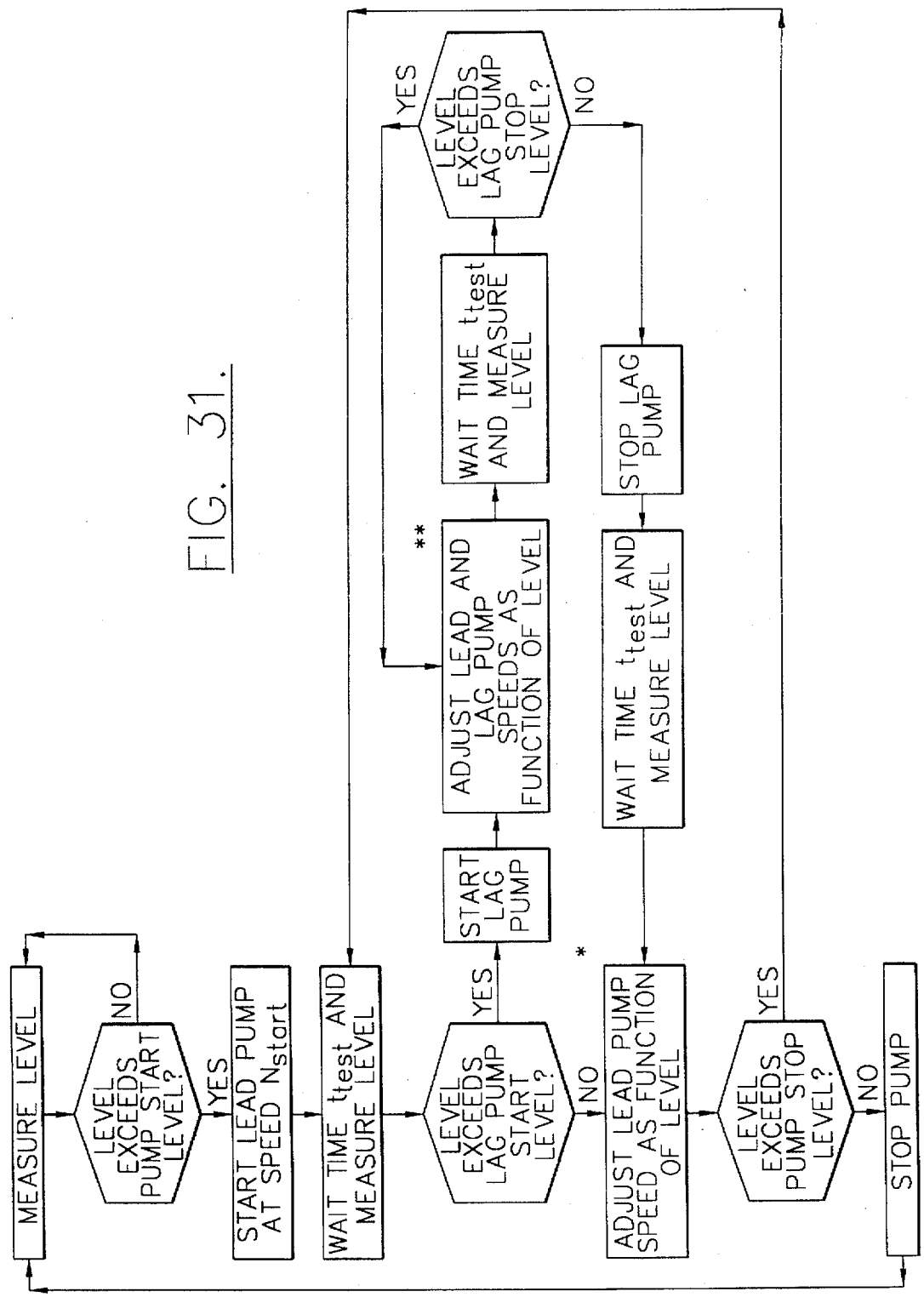
FIG. 31 is a flow chart of the control scheme for a multipump, variable-speed system.

In FIG. 30b the control scheme is similar, except that pump #2 becomes the lead pump. The "function" in the step marked with one asterisk in FIG. 31 is:

$N^{(2)}=N_{min}^{(2)}$, level≤lead pump start level $N^{(2)}=N_{min}^{(2)}+A_5$(level–lead pump start level), lead pump start level<level where $N_{min}^{(2)}$ is the speed at which pump #2 provides minimum CPMG and flow $Q_{min}^{(2)}$. In this case the lag pump start level is chosen to correspond to the level at which the step indicated in the asterisked box in FIG. 31 would begin to call for flow>$Q_2$.

Multipump, Constant-Speed System

In a constant-speed system, each operating mode has a single outflow and efficiency value. Even though pump speed cannot be varied, cost per output or throughput efficiency can still be used to control pump selection. Consider the example of a two-pump system. FIG. 32 shows an exemplary control scheme, with the lead pump assignment typically alternating between pump #1 and pump #2.

More efficient operation is achieved by assigning the lead pump to the pump that most recently had the highest efficiency or the lowest cost per throughput. For example, let $CPMG_1$ and $CPMG_2$ be the respective CPMG values of pump #1 and pump #2 alone. The system records and updates these quantities each appropriate pumping cycle. Then pump #1 becomes the lead pump whenever $CPMG_1<CPMG_2$, and pump #2 becomes the lead pump whenever $CPMG_1>CPMG_2$.

Under normal operation, in which CPMG increases over time due to standard component degradation, this method will roughly equalize the run time between pumps, since the less degraded pump will have the lower CPMG. If one pump suffers an unusual problem that causes a rapid CPMG increase that is unmatched by the other pump, then the method of the present invention will properly prefer the other pump until the problem is corrected. Moreover, the problem will be easily identifiable by the disparity in run times.

In many cases, and especially with constant-speed pumps, the control system does not include transducers for measuring pump motor power. In this case run time per quantity pumped can be used as an approximate efficiency parameter. This approximate efficiency parameter can be used for energy-efficient control, as described above.

In other cases, the system lacks means for calculating flow. In these cases, the elapsed running time of each pump can be measured and the pump with the lowest elapsed time or the highest flow can be assigned as the lead pump. This control method tends to increase energy efficiency, because the more efficient pump will generally empty the well faster and will therefore be activated more often when the system tries to equalize run time.

If lead pump assignment is controlled to equalize run time, additional information should be displayed to allow the operator to recognize pump degradation. For example, if outflow from each pump is recorded (excluding times when both pumps operate simultaneously), pump degradation will be indicated by a lower outflow. Alternatively, the number of starts and run time per start can be recorded (again excluding pump cycles in which both pumps operate simultaneously). Then pump degradation is indicated by a smaller number of starts or longer run time per start, without a need for flow measurement.

Advantages of CPMG over WTWE

Previous work has described both power ratio (such as WTWE) and throughput per energy efficiency parameters. Previous work, however, did not teach that the preferred parameter depends on the application. If the goal is to maintain a given flow rate, then either type of parameter can be effective. The energy-management aspects of this invention primarily address a different class of pumping applications, in which the goal is to maintain the quantity of fluid in a vessel within a predetermined range. For this large class of applications, throughput per energy and cost per throughput have previously unrecognized advantages.

CPMG is preferred for optimizing pumping speed and pump selection for efficiency. In a wastewater lift station, a critical task is to remove the inflow from the wet well before the wet well overflows. In a variable-speed system this task can be accomplished by running the pump fast for a short time, or slow for a longer time (as long as the outflow exceeds the time-average inflow). These two operating modes are compared in FIG. 26a. In this example the high-speed mode has a higher WTWE (55%) than the lower-speed mode (50%). However, because the high-speed mode produces excess dynamic head associated with its higher outflow rate, it consumes almost 7 times as much energy as the low-speed mode. The WTWE is high because it does not distinguish between useful and excess hydraulic output power related to excess dynamic head. CPMG, on the other hand, correctly identifies the energy and cost savings of the lower-speed operating mode. WTWE can be improved by subtracting the overpressure, as measured at the system's delivery outlet, from the pump discharge pressure. However, the excess discharge pressure generated by the pump may be considerably larger than the overpressure measured at the system outlet, because of pressure drops between the pump discharge and the system outlet. Moreover, this approach introduces additional measurement error, cost, and complexity by increasing the number of pressure transducers and associated measurement locations.

CPMG better characterizes overall system performance and is therefore preferred for identifying degradation of nonpump components or suboptimal interactions between pumps. WTWE has traditionally been used to characterize the efficiency of both pumps and pumping systems. CPMG, however, is more appropriate for characterizing overall system performance, because it is more sensitive to changes in the pump's hydraulic environment, that is, the inflows, valves, pipeline networks, and other pumps connected to a given pump. For example, a partially blocked output pipeline will reduce the outflow at a given pump speed, but also will increase the head pressure. Likewise, a second pump using the same output pipeline will increase head pressure and reduce flow through the first pump at a given pumping speed. CPMG will clearly increase in either case since the pump must now do extra work to pump the same volume of material.

WTWE, on the other hand, measures the product of head pressure and outflow, and therefore it may change relatively little in either example; in some cases it may even increase. WTWE in some cases is preferred for characterizing pumps alone, as in this example where the pump continues to function properly even as changes in its hydraulic environment raise the overall energy costs.

CPMG is preferred for predicting operating costs for future or hypothetical system operating modes, configurations, and time periods. Having a reliable projected operating cost is advantageous for designing, modifying, operating, and maintaining pump systems cost effectively. In many applications, including wastewater lift stations, material throughput rate is a relatively constant operating specification, or is at least the most predictable system requirement. In these cases the preferred method for calculating predicted operating costs is:

Projected cost=CPMG×projected average throughput rate×time

Hydraulic power output, in these cases, is not directly specified, but takes on whatever value is required to provide the necessary throughput. Therefore, there is no equally reliable method for using WTWE to calculate projected cost.

All the advantages described above hold for any cost per throughput or throughput per energy parameter, including parameters that do not fall under the rigid definitions given. While these definitions include the most preferred embodiments, any parameter with monotonic functional dependence on cost per throughput or throughput per energy within a given operating range will provide similar advantages. One example of such a parameter is a monotonic polynomial function of CPMG.

More generally, if a parameter P' and a given cost per throughput or throughput per energy parameter P both depend in part on a common set of system parameters $\{q_i\}$ within a certain range $D(\{q_i\})$, then P' will provide similar advantages over any range that is a subset of D and within which P' and P increase and decrease substantially together, and particularly f relative extrema of P' and P occur in approximately the same regions of D.

It may be appreciated by one skilled in the art that additional embodiments may be contemplated, including, but not limited to, monitoring and control systems for other pumping operations such as water supply, oil and gas wells and pipelines, and liquid treatment or manufacturing plants.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A system for monitoring operating parameters of a pump station having a pump for pumping a liquid, the system comprising:
    means for sensing a plurality of operating parameters of the pump station;
    means for determining a flow cycle time of the pump station;
    means in communication with the sensing means for transmitting the operating parameters to an operator in real time;
    means in communication with the sensing means for storing the sensed operating parameters at predetermined time intervals over a predetermined period of time;
    means in communication with the storing means for displaying a time history of the operating parameters; and
    means in communication with the sensing means for calculating a real-time cost parameter of the system averaged over an integral number of flow cycles.

2. The system recited in claim 1, wherein the real-time cost parameter comprises energy usage per quantity of fluid pumped.

3. A system for monitoring operating parameters of a pump station having a pump for pumping a liquid, the system comprising:
    means for sensing a plurality of operating parameters of the pump station;
    means in communication with the sensing means for transmitting the operating parameters to an operator in real time;
    means in communication with the sensing means for storing the sensed operating parameters at predetermined time intervals over a predetermined period of time;
    means in communication with the storing means for displaying a time history of the operating parameters;
    means in communication with the sensing means for calculating a real-time cost parameter of the system; and
    means in communication with the calculating means for predicting a future cost parameter over a predetermined period of time.

4. The system recited in claim 3, wherein the future cost parameter comprises a predicted energy usage per quantity of fluid pumped.

5. The system recited in claim 1, further comprising means in communication with the storing means for identifying a degradation of an element of the pump station from a correlation of the real-time operating parameters with the time history of the operating parameters.

6. The system recited in claim 1, further comprising means in communication with the storing means for disabling the pump upon a comparison of the real-time operating parameters with predetermined acceptable ranges of the operating parameters.

7. A control system for interfacing between an operator and a pump station having a pump for pumping a liquid, the system comprising:
    means for sensing a plurality of operating parameters of the pump station;
    means in communication with the sensing means for transmitting the operating parameters to the operator in real time;
    means for the operator to communicate a control signal to the pump station to effect a change in an operating parameter;
    means in communication with the sensing means for calculating from the sensed parameters a real-time cost parameter of the system; and
    means in communication with the calculating means for displaying the cost parameter to the operator.

8. The system recited in claim 7, further comprising:
    means in communication with the cost-parameter calculating means for calculating a potential optimized cost parameter from the sensed parameters and the real-time cost parameter; and
    means in communication with the optimized cost-parameter calculating means for determining and displaying to the operator a recommended change in an operating parameter needed to achieve the optimized cost parameter.

9. A control system for optimizing the energy usage of a pump station having a pump for pumping a liquid, the system comprising:

means for sensing a plurality of operating parameters of the pump station;

means for determining a flow cycle time of the pump station;

an interface in communication with the sensing means between an operator and the pump station for transmitting the sensed operating parameters and the determined flow cycle time to the operator and for transmitting a control signal from the operator to the pump station;

means in communication with the sensing means for calculating energy usage information averaged over an integral number of flow cycles from the sensed operating parameters and the determined flow cycle time;

means in communication with the calculating means for displaying the energy usage information to the operator; and means in communication with the interface for permitting the operator to adjust a pump station operating parameter with a control signal to optimize for an energy usage parameter.

10. A control system for optimizing the energy usage of a pump station having a pump for pumping a liquid, the system comprising:

means for sensing a plurality of operating parameters of the pump station;

an interface in communication with the sensing means between an operator and the pump station for transmitting the sensed operating parameters to the operator and for transmitting a control signal from the operator to the pump station;

means in communication with the sensing means for calculating energy usage information from the sensed operating parameters;

means in communication with the calculating means for displaying the energy usage information to the operator;

means in communication with the interface for permitting the operator to adjust a pump station operating parameter with a control signal to optimize for an energy usage parameter; and means in communication with the calculating means for determining a set of altered operating parameters required to achieve an optimized energy usage parameter and for transmitting the set to the operator.

11. An interactive interface and display system for providing communication between an operator and a pump station having a plurality of sensors for sensing a plurality of operating parameters, the system comprising:

a processor;

means for transmitting the operating parameters from the pump station to the processor;

means resident in the processor for performing real-time calculations on the operating parameters to provide an efficiency parameter comprising an energy usage per volume of liquid pumped;

means in communication with the processor for storing time histories of the operating parameters at predetermined time intervals and of the efficiency parameter over a predetermined period of time; and visual display means in communication with the processor for displaying the operating parameters and the efficiency parameter in real time and for displaying the time histories of the operating parameters and efficiency variable.

12. A method for optimizing an efficiency parameter of a wastewater pumping system having a variable-speed pump for pumping wastewater from a wet well, the wastewater having a level in the wet well, the method comprising the steps of:

setting a wet-well level for starting the pump;

setting a wet-well level for stopping the pump;

determining a minimum pump speed at which the efficiency parameter is an optimal value;

determining the wet-well level;

starting the pump when the level is greater than or equal to the pump start level;

running the pump at the minimum pump speed when the wet-well level is less than or equal to the pump start level;

running the pump at a level-dependent pump speed higher than the minimum pump speed when the wet-well level is greater than the pump start level, the pump speed generally equal to the minimum pump speed plus a level-dependent pump speed increment; and stopping the pump when the level is less than or equal to the pump stop level.

13. A method for monitoring operating parameters of a pump station having a pump for pumping a liquid, the method comprising the steps of:

sensing a plurality of operating parameters of the pump station;

determining a flow cycle time of the pump station;

transmitting the operating parameters to an operator in real time;

storing the sensed operating parameters at predetermined time intervals over a predetermined period of time;

displaying a time history of the operating parameters; and calculating a real-time cost parameter of the system averaged over an integral number of flow cycles.

14. The system recited in claim 1, wherein the sensing means comprises means for sensing a fluid level in the pump.

15. The system recited in claim 1, wherein the sensing means comprises means for sensing an energy usage of the pump and means for sensing a quantity of fluid pumped per unit time.

16. The system recited in claim 15, wherein the real-time cost parameter comprises the energy usage per quantity of fluid pumped.

17. The system recited in claim 1, further comprising means in communication with the sensing means for issuing an alarm when an operating parameter is sensed to have a value outside preset acceptable limits.

18. The system recited in claim 17, wherein the storing means further comprises means in communication with the alarm issuing means for storing a time history of issued alarms over a desired period of time.

19. The system recited in claim 18, wherein the displaying means further comprises means for displaying the time history of issued alarms.

20. The system recited in claim 1, wherein the sensing means comprises means for sensing operating parameters of the pump and a level of fluid to be pumped.

21. A control system for interfacing between an operator and a pump station having a plurality of differentially controllable pumps for pumping a liquid, the system comprising:

means for sensing a plurality of operating parameters of the pump station, including a plurality of operating parameters of the pumps;

means for determining a flow cycle time of the pump station;

means in communication with the sensing means for transmitting the operating parameters to the operator in real time;

means for the operator to communicate a control signal to the pump station to effect a change in an operating parameter;

means in communication with the sensing means for calculating from the sensed parameters a real-time cost parameter of the system averaged over an integral number of flow cycles; and means in communication with the calculating means for displaying the cost parameter to the operator.

22. A control system for interfacing between an operator and a pump station having a plurality of differentially controllable pumps for pumping a liquid, the system comprising:

means for sensing a plurality of operating parameters of the pump station, including a plurality of operating parameters of the pumps;

means in communication with the sensing means for transmitting the operating parameters to the operator in real time;

means for the operator to communicate a control signal to the pump station to effect a change in an operating parameter, comprising means for the operator to configure a set of setup parameters for the pumps;

means in communication with the sensing means for calculating from the sensed parameters a real-time cost parameter of the system; and means in communication with the calculating means for displaying the cost parameter to the operator.

23. The control system recited in claim 22, wherein the control signal communication means comprises means for the operator to direct a pump alternation scheme for the pumps.

24. The control system recited in claim 23, wherein the real-time cost parameter comprises a real-time cost per quantity of fluid pumped, and further comprising:

means in communication with the cost-parameter calculating means for calculating a potential optimized cost per quantity of fluid pumped from the sensed parameters and the real-time cost per quantity of fluid pumped; and means in communication with the optimized cost-per-quantity-of-fluid-pumped calculating means for determining and displaying to the operator a recommended change in an operating parameter needed to achieve the optimized cost per quantity pumped, thereby permitting the operator to effect an optimization of the cost per quantity of fluid pumped by communicating an appropriate control signal to the pump station.

25. A method for operating a pump in a water pumping station comprising the steps of:

increasing a speed of a pump being used in a water pumping station from a first rate to a second higher outflow rate responsive to a sensor detecting a threshold amount of water to be pumped from the water pumping station;

detecting a water throughput flow rate associated with a selected energy input to the pump;

determining a cost efficiency comprising an energy cost per unit volume of the water pumped at a time of usage of energy;

adjusting the pump speed to optimize the cost efficiency of pumping the water; and decreasing the speed of the pump to a third outflow rate lower than the second rate upon achieving a preset value for a parameter of the station.

26. The method recited in claim 25, further comprising the step of determining an additional operating cost per unit flow rate the pump the water and adding the additional cost to the energy cost.

27. The method recited in claim 26, wherein the additional operating cost determining step comprises determining at least one of a maintenance cost of the pumping station and an equipment depreciation cost.

28. The method recited in claim 25, wherein the pump comprises a first pump, and further comprising the step of activating a second pump when a water inflow rate exceeds a threshold for efficient operation of the first pump for optimizing efficiency.

29. The method recited in claim 28, wherein the activating step comprises activating the second pump to operate at an outflow rate different from the outflow rate of the first pump to optimize efficiency.

30. The method recited in claim 25, wherein at least one of the first rate or the third rate can comprise a nonpumping rate.

31. The method recited in claim 25, wherein the parameter comprises at least one of the wet-well level and the cost per unit volume of the water pumped.

32. A method for operating a water pumping station comprising the steps of:

increasing a speed of a pump being used in a water pumping station from a first rate to a second higher outflow rate responsive to a sensor detecting a threshold amount of water to be pumped from the water pumping station;

detecting a water throughput flow rate for an energy input to the pump;

determining a cost efficiency comprising a cost per unit volume of the water pumped at the station over a complete cycle of a characteristic parameter of the station; and returning the pump to a third outflow rate lower than the second outflow rate upon achieving a preset value for the characteristic parameter of the station.

33. The method recited in claim 32, further comprising the step of optimizing a cost efficiency of pump operation for the characteristic parameter.

34. The method recited in claim 32, wherein the cost per unit volume determining step further comprises determining an energy cost at a time of usage.

35. The method recited in claim 32, wherein the station includes a plurality of pumps operable to optimize the cost per unit volume of water pumped.

36. The method recited in claim 35, wherein an optimum efficiency for each of the plurality of pumps in a selected combination of pumps depends upon a speed of other pumps in the selected combination.

37. The method recited in claim 32, further comprising the steps of:

monitoring the cost per unit volume of water pumped; and comparing the cost per unit volume with a predetermined value characteristic of sound operation, thereby monitoring the pump for a deficient operational cost state.

38. The method recited in claim 37, wherein the deficient operational cost state comprises at least one of a defective pump state and an increased operational cost state.

39. The method recited in claim 32, wherein the increasing step from the first rate to the second rate comprises skipping an outflow rate intermediate between the first rate and the second rate.

40. The method recited in claim 32, further comprising the steps of:

comparing a cost per unit volume of a present water outflow rate with a cost per unit volume of a higher outflow rate; and increasing a speed of a second pump to achieve a higher water outflow rate upon determining a threshold cost efficiency has been reached.

41. The method recited in claim 40, wherein the speed increasing step comprises increasing the speed by means of a discontinuous increase.

42. The method recited in claim 32, wherein the determining step comprises determining a complete cycle over at least one of:

a water level cycle in the pumping station;

a rate of water inflow cycle into the pumping station; and a diurnal operation cycle of the pumping station.

43. The method recited in claim 32, further comprising the step of optimizing the cost efficiency over a complete cycle of the characteristic parameter.

44. A method of operating a water pumping station having a well and a plurality of pumps, the method comprising the steps of:

activating a video display comprising a video image showing at least one of:
  a water level image in a schematic water well;
  a bar graph of water outflow rate from the well;
  a bar graph of cost per unit volume of water being pumped from the well; and
  a schematic configuration of pumps available for operation in the station;

pressing a control segment of the video display to increase a speed of a pump from a first water outflow rate to a second higher water outflow rate;

measuring a water throughput flow rate at the second rate;

stepping through a plurality of water outflow rates;

monitoring an efficiency for each of the water outflow rates;

pressing the control segment of the video display to activate a pump operational state for a desired water outflow rate having an optimum efficiency; and returning the pump to a lower water outflow rate upon achieving a preset value for a parameter of the station.

45. The method recited in claim 44, further comprising the step of depressing a visual image control on the video display for changing at least one of:

a number of pumps being used; and a speed of one of the pumps being used.

46. The method recited in claim 44, further comprising the step of pressing a second visual image control segment on the video display for activating a simulation computer program allowing a user to modify at least one of a group of parameters comprising:

a simulated level of water in the well;

a speed of a pump; and a number of pumps in use;

thereby enabling the user to view in real time an effect of changing the at least one of the group of parameters.

47. The method recited in claim 44, further comprising the steps of:

calculating a cost efficiency of operating the pump over a predetermined time period; and displaying a history of the cost efficiency, thereby enabling a user to evaluate cost efficiency over time and pump operability.

48. A method of operating a water pumping station comprising the steps of:

activating a video display comprising a visual image including a visual output of historical data for water outflow, energy consumption of at least one pump, and an efficiency value associated with the pump;

displaying a visual image showing in real time a water outflow rate, energy consumption of the pump, and an efficiency value associated with the pump;

actuating graphical means disposed on the video display to change a speed of the pump;

comparing real-time values of the water outflow rate, energy consumption, and efficiency value with corresponding respective historical values;, and determining an efficiency value for the station from at least one of the water outflow rate, the energy consumption, and number of active, water pumps.

49. The method recited in claim 48, wherein the displaying step comprises displaying at least one of a graphical image and a tabular image.

50. The method recited in claim 48, further comprising the step, following the determining step, of optimizing the efficiency value.

51. The method recited in claim 50, wherein the determining and the optimizing step comprise determining and optimizing a cost per unit volume of water pumped.

52. The method recited in claim 48, wherein the determining step comprises determining at least one of wire-to-water efficiency and energy cost per unit volume of water pumped.

53. The method recited in claim 48, wherein the actuating step comprises actuating a touch screen of the video display.

* * * * *